(12) United States Patent
Marpe et al.

(10) Patent No.: US 7,286,710 B2
(45) Date of Patent: Oct. 23, 2007

(54) CODING OF A SYNTAX ELEMENT CONTAINED IN A PRE-CODED VIDEO SIGNAL

(75) Inventors: Detlev Marpe, Berlin (DE); Heiko Schwarz, Berlin (DE); Thomas Wiegand, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 661 days.

(21) Appl. No.: 10/677,886

(22) Filed: Oct. 1, 2003

(65) Prior Publication Data

US 2005/0074176 A1 Apr. 7, 2005

(51) Int. Cl.
*G06K 9/46* (2006.01)
*G06K 9/36* (2006.01)
*H03M 7/34* (2006.01)
*H03M 7/00* (2006.01)

(52) U.S. Cl. .................. 382/239; 382/247; 341/51; 341/107

(58) Field of Classification Search ............ 341/107, 341/51, 52; 382/239, 247; 375/240.24, 375/240.18, 240.23
See application file for complete search history.

(56) References Cited

U.S. PATENT DOCUMENTS

| | | | | |
|---|---|---|---|---|
| 5,091,782 A | * | 2/1992 | Krause et al. | 348/400.1 |
| 5,227,878 A | * | 7/1993 | Puri et al. | 375/240.15 |
| 5,347,308 A | * | 9/1994 | Wai | 375/240.23 |
| 5,434,622 A | * | 7/1995 | Lim | 348/400.1 |
| 6,275,533 B1 | * | 8/2001 | Nishi | 375/240.24 |
| 6,795,584 B2 | * | 9/2004 | Karczewicz et al. | 382/239 |
| 6,927,710 B2 | * | 8/2005 | Linzer et al. | 341/107 |
| 6,980,596 B2 | * | 12/2005 | Wang et al. | 375/240.16 |
| 2005/0053296 A1 | * | 3/2005 | Srinivasan et al. | 382/236 |
| 2005/0169374 A1 | * | 8/2005 | Marpe et al. | 375/240.16 |

OTHER PUBLICATIONS

Atul Puri et al., "Adaptive frame/field motion compensated video coding," Signal Processing Image Communication, vol. 5, No. 1/02, Feb. 1, 1993, pp. 39-58.*

(Continued)

*Primary Examiner*—Jingge Wu
*Assistant Examiner*—Jeffrey S Smith
(74) *Attorney, Agent, or Firm*—Michael A. Glenn; Glenn Patent Group

(57) ABSTRACT

A method for encoding a syntax element contained in a precoded video signal into a coded bit stream, the precoded video signal representing at least one video frame, the syntax element being associated with a predetermined portion of the video frame and being indicative of as to whether the predetermined portion of the video frame is precoded in a first or a second way into the precoded video signal is described. The method comprises investigating as to whether a neighboring portion of the video frame neighboring the predetermined portion is precoded in the first way or the second way, in order to obtain a binary value; assigning one of at least two context models to the predetermined portion of the video frame based on the binary value, wherein each context model is associated with a different probability estimation; and arithmetically encoding the syntax element into the coded bit stream based on the probability estimation with which the assigned context model is associated.

26 Claims, 9 Drawing Sheets

OTHER PUBLICATIONS

Wiegand, Thomas, et al; "Draft ITU-T; Recommendation and Final Draft International Standard of Joint Video Specification; ITU-T Rec. H.264; ISO/IEC 1449-10 AVC"; 8th Meeting: Geneva, Switzerland, May 23-27, 2003.

Wiegand, Thomas, et al; "Overview of the H.264/AVC Video Coding Standard"; IEEE Transaction on Circuit and Systems for Video Technology, vol. 13 No. 7, July.

ISO/IEC 13818-2: 1995 (E) Specification.

Sullivan, Gary: "Draft Text of Recommendation H.263 Version 2 ("H.263+") for Decision"; Study Group 16—Contribution COM-999; Study Period 1997-2000.

International Organization For Standardization; Organization Normalization; "Information Technology—Coding of Audio Visual Objects—Part 2: Visual"; N4350.

Gonzales, C.A., et al; "DCT Coding for Motion Video Storage using Adaptive Arithmetic Coding"; Signal Processing: Image Communication 2 (1960); vol. 2, No. 2, pp. 145-154; Aug. 1990.

Marpe, Detlev, et al; "Adaptive Codes for H.26L"; ITU-T Telecommunications Standardization Sector; Video Coding Experts Group Document; Document VCEG-L13; Twelfth Meeting: Eibsee, Germany, Jan. 9-12, 2001.

Marpe, Detlev, et al; "Further Results for CABAC entropy coding scheme"; ITU-T Telecommunications Standardization Sector; Video Coding Experts Group Document; Document VCEG-M59; Thirteenth Meeting: Austin, Texas, USA Apr. 2-4, 2001.

Marpe, Detlev, et al; "Improved CABAC"; ITU-T Telecommunications Standardization Sector; Video Coding Experts Group Document; Document VCEG-018r1; 15th Meeting: Pattaya, Thailand, Dec. 4-6, 2001.

Marpe, Detlev, et al; "New Results on Improved CABAC"; Joint Video Team of ISO/IEC MEG & ITU-T VCEG, Document JVT-B101; 2nd Meeting: Geneva, CH, Jan. 29-Feb. 1, 2002.

Schwarz, Heiko, et al; "Improved CABAC"; Joint Video Team of ISO/IEC MPEG & ITU-T VCEG; Document JVT-C060; 3rd Meeting: Fairfax, Virginia, USA, May 6-10, 2002.

Marpe, Detlev, et al; "Fast Arithmetic Coding for CABAC"; Joint Video Team of ISO/IEC MPEG & ITU-T VCEG; Document JVT-C060; 3rd Meeting: Fairfax, Virginia, USA, May 6-10, 2002.

Schwarz, Heiko, et al.; "CABAC and Slices"; Joint Video Team of ISO/IEC MPEG & ITU-T VCEG; Document JVT-D020r1; 4th Meeting: Klagenfurt, Austria, Jul. 22-26, 2002.

Karczewicz, Marta, et al.; "Analysis and Simplification of Intra Prediction"; Joint Video Team of ISO/IEC MPEG & ITU-T VCEG; Document JVT-D025; 4th Meeting: Klagenfurt, Austria, Jul. 22-26, 2002.

Marpe, Detlev, et al.; "Proposed Cleanup changes for CABAC"; Joint Video Team of ISO/IEC MPEG & ITU-T VCEG; Document: JVT-E059; 5th Meeting: Geneva, CH, Oct. 9-17, 2002.

Bossen, Frank; "CABAC cleanup and complexity reduction"; Joint Video Team of ISO/IEC MPEG & ITU-T VCEG; Document: JVT-Exxx; 5th Meeting: Geneva, Switzerland, Oct. 2002.

Marpe, Detlev, et al; "Final CABAC cleanup"; Joint Video Team of ISO/IEC MPEG & ITU-T VCEG; Document: JVT-F039; 6th Meeting: Awaji, Island, JP, Dec. 5-13, 2002.

Marpe, Detlev and Hans L. Cycon; "Very Low Bit—Rate Video Coding Using Wavelet—Based Techniques"; IEEE Transactions on Circuits and Systems for Video Technology; vol. 9, No. 1, Feb. 1999.

Heising, G., et al; "Wavelet-based very low Bitrate coding using image warping"; IEE Proc.-Vis. Image Signal Process, vol. 148, No. 2, Apr. 2001.

Choi, Seung-Jong, and John W. Woods; "Motion-Compensated 3-D Subband Coding of Video"; IEEE Transactions on Image Processing, vol. 8, No. Feb. 1999.

Said, Amir and William A. Pearlman; "A new fast and efficient image codec based on set partitioning in hierarchical trees"; IEEE Int. Smyp on Circuits and Systems, Chigcago, IL May 1993.

Marpe, Detlev and Hans L. Cycon; "Efficient Pre-Coding Techniques for Wavelet-Based Image Compression"; Proc. Int. Picture Coding Symposium, pp. 45-50, 1997.

Rissanen, Jorma and Glen G. Landgon, Jr; "Universal Modeling and Coding"; IEEE Transactions on Information Theory; vol. It-27, No. 1, Jan. 1981.

Rissanen, Jorma; "Universal Coding, Information, Prediction, and Estimation"; IEEE Transactions on Information Theory; vol. It-30, No. 4, Jul. 1984.

Weinberger, Marcelo J., et al; "Applications of universal context modeling to lossless compression of grey-scale images"; IEEE Transactions on Imaging Processing; vol. 5, No. 4, Apr. 1996.

Teuhola, Jukka; "A Compression Method of Clustered Bit-Vektors"; Information Processing Letters, vol. 7, No. 6, pp. 308-311, Oct. 1978.

Gallager, Robert G. and David C. Van Voorhis; "Optimal Source Codes for Geometrically Distributed Integer Alphabets"; IEEE Transactions on Information Technology; pp. 228-230, Mar. 1975.

Mrak, Marta, et al.; "A Context Modeling Algorithm and its Applications in Video Compression"; Fraunhofer-Institute HHI, Berlin, Germany.

Pennebaker, W.B., et al; "An overview of the basic principles of the Q-Coder adaptive binary arithmetic coder"; IBM. J. Res. Develop, vol. 32, No. 6, Nov. 1988.

Rissanen, Jorma and K. M. Mohiuddin; :A multiplication-free multialphabet arithmetic code; IEEE Transactions on Communications; vol. 37, No. 2, Feb. 1989.

Howard, Paul G. and Jeffrey Scott Viter; "Practical implementations of arithmetic code"; Brown University, Department of Computer Science, Technical Report No. 92-18; Revised version, Apr. 1992, Formerly Technical Report No. CS-91-45.

"Sample Data Coding"; Chapter 12, pp. 473-484.

Moffat, Alistair, et al; "Arithmetic Coding Revisited"; ACM Transactions on Information Systems, vol. 16, No. 3, pp. 256-294, Jul. 1998.

Wiegand, Thomas, et al; "Rate-Constrained Coder Control and Comparison of Video Coding Standards"; IEEE Transaction on Circuits and Systems for Video Technology; vol. 13, No. 7, Jul. 2003.

Wiegand, Thomas; "Draft ITU-T Recommendation and Final Draft International Standard of Joint Video Specification (ITU-T Rec. H.264; ISO/IEC; 14496-10 AVC)"; Document: JVT-G050; 7th Meeting: Pattaya, Thailand, Mar. 7-14, 2003.

"Video Codec For Audiovisual Services at p•64 kbit/s"; International Telecommunication Union; H.261 (Mar. 1993).

Wenger, Stephen; "H.264/AVC Over IP"; IEEE Transactions on Circuits and Systems for VideoTechnology; vol. 13, No. 7, Jul. 2003.

Stockhammer, Thomas, et al; "H.264/AVCinWireless Environments"; IEEE Transactions on Circuits and Systems for VideoTechnology; vol. 13, No. 7, Jul. 2003.

Wedi, Thomas and Hans Georg Musmann; "Motion-and Aliasing-Compensated Prediction for Hybrid Video Coding"; IEEE Transactions on Circuits and Systems for VideoTechnology: vol. 13, No. 7, Jul. 2003.

Wiegand, Thomas, et al; "Long Term Memory Motion-Compensated Prediction"; IEEE Transactions on Circuits and Systems for VideoTechnology; vol. 9, No. 1, Feb. 1999.

Flierl, Markus, et al; "A locally design algorithm block-based multi-hypothesis motion-compensated prediction"; Proceedings of the IEEE DCC, pp. 239-248, Snowbird, Utah; Mar. 1988.

Flierl, Markus and Bernd Girod; "Generalized B Pictures and the Draft H.264/AVC Codec"; IEEE Transactions on Circuits and Systems for VideoTechnology; vol. 13, No. 7, Jul. 2003.

Karczewicz, Marta and Ragip Kurceren; "The SP—and SI—Frames Design for H.264/AVC"; IEEE Transactions on Circuits and Systems for VideoTechnology; vol. 13, No. 7, Jul. 2003.

Marpe, Detlev et al; "Context-Based Adaptive Binary Arithmetic Coding in the H.264/AVC Video Compression Standard"; IEEE Transactions on Circuits and Systems for VideoTechnology; vol. 13, No. 7, Jul. 2003.

Malvar, Henrique S. et al; "Low-complexity Transformed Quantization in H.264/AVC"; IEEE Transactions on Circuits and Systems for VideoTechnology; vol. 13, No. 7, Jul. 2003.

List, Peter, et al; "Adaptive Deblocking Filter"; IEEE Transactions on Circuits and Systems for VideoTechnology; vol. 13, No. 7, Jul. 2003.

Ribas-Cobera, Jordi et al; "A Generalized Hypothetical Reference Decoder for H.264/AVC"; IEEE Transactions on Circuits and Systems for VideoTechnology; vol. 13, No. 7, Jul. 2003.

Marpe, Detlev et al; "Proposed Editorial Changes and Cleanup of CABAC"; Joint Video Team of ISO/IEC MPEG & ITU-T VCEG; Document JVT-D019; 4th Meeting: Klagenfurt, Austria. Jul. 22-26, 2002.

Wiegand, Thomas: "Study of Final Committee Draft of Joint Video Specification (ITU-T Rec. H.264, ISO/IEC 14496-10 AVC0)"; Joint Video Team of ISO/IEC MPEG & ITU-T VCEG; Document JVT-F100d2; 6th Meeting: Awaji, Island, JP, Dec. 5-13, 2002.

Wiegand, Thomas: "Study of Final Committee Draft of Joint Video Specification (ITU-T Rec. H.264, ISO/IEC 14496-10 AVC0)"; Joint Video Team of ISO/IEC MPEG & ITU-T VCEG; Document JVT-F100; 6th Meeting: Awaji, Island, JP, Dec. 5-13, 2002.

The Concept of a Random Variable, pp. 82-84.

Marpe, Detlev, et al; "Improved CABAC"; ITU—Telecommunications Standardization Sector; VCEG-018r1; 15th Meeting: Pattaya, Thailand, Dec. 4-6, 2001.

* cited by examiner

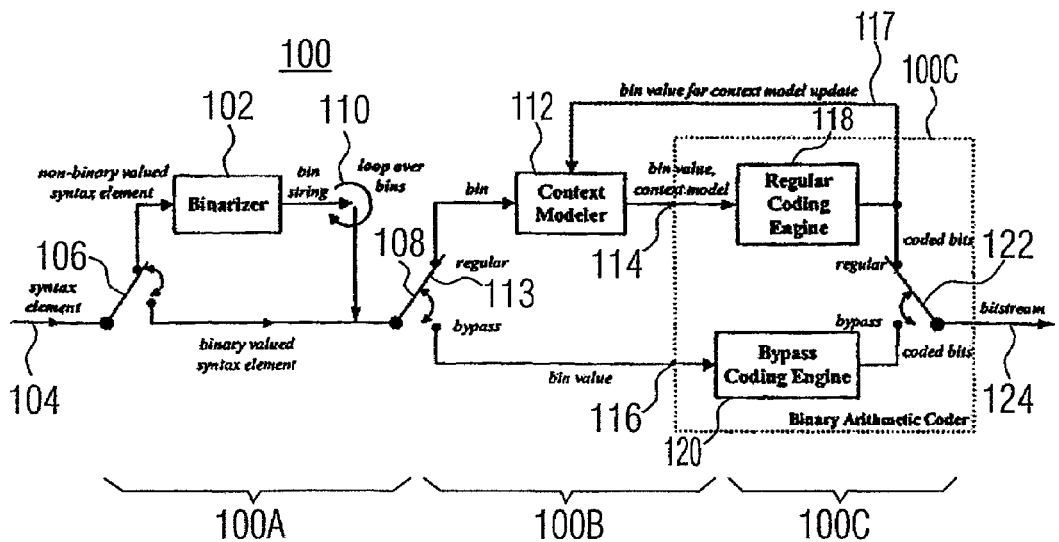

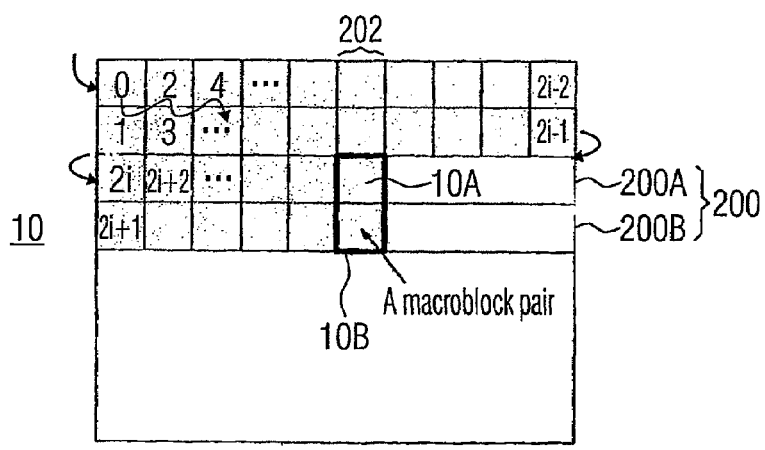

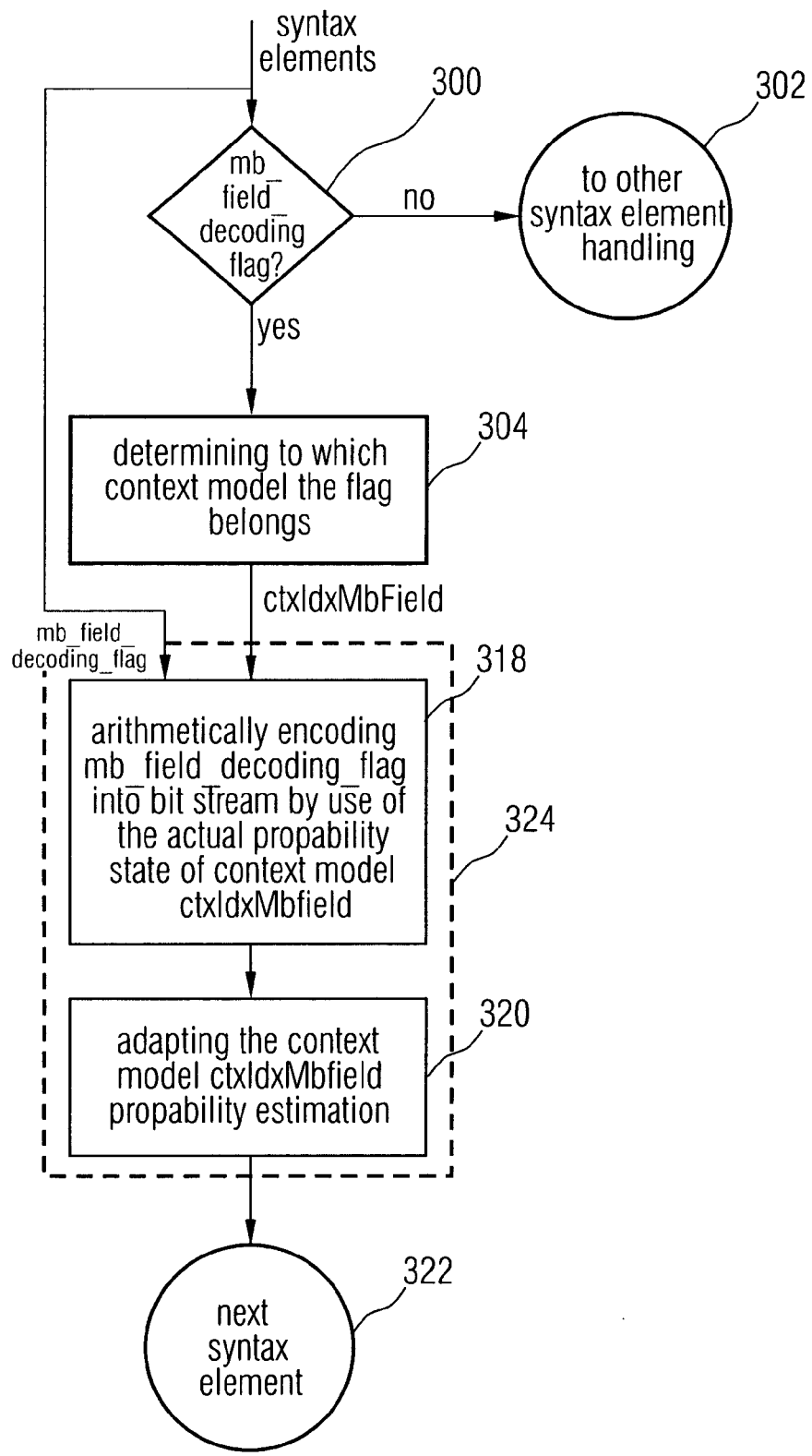

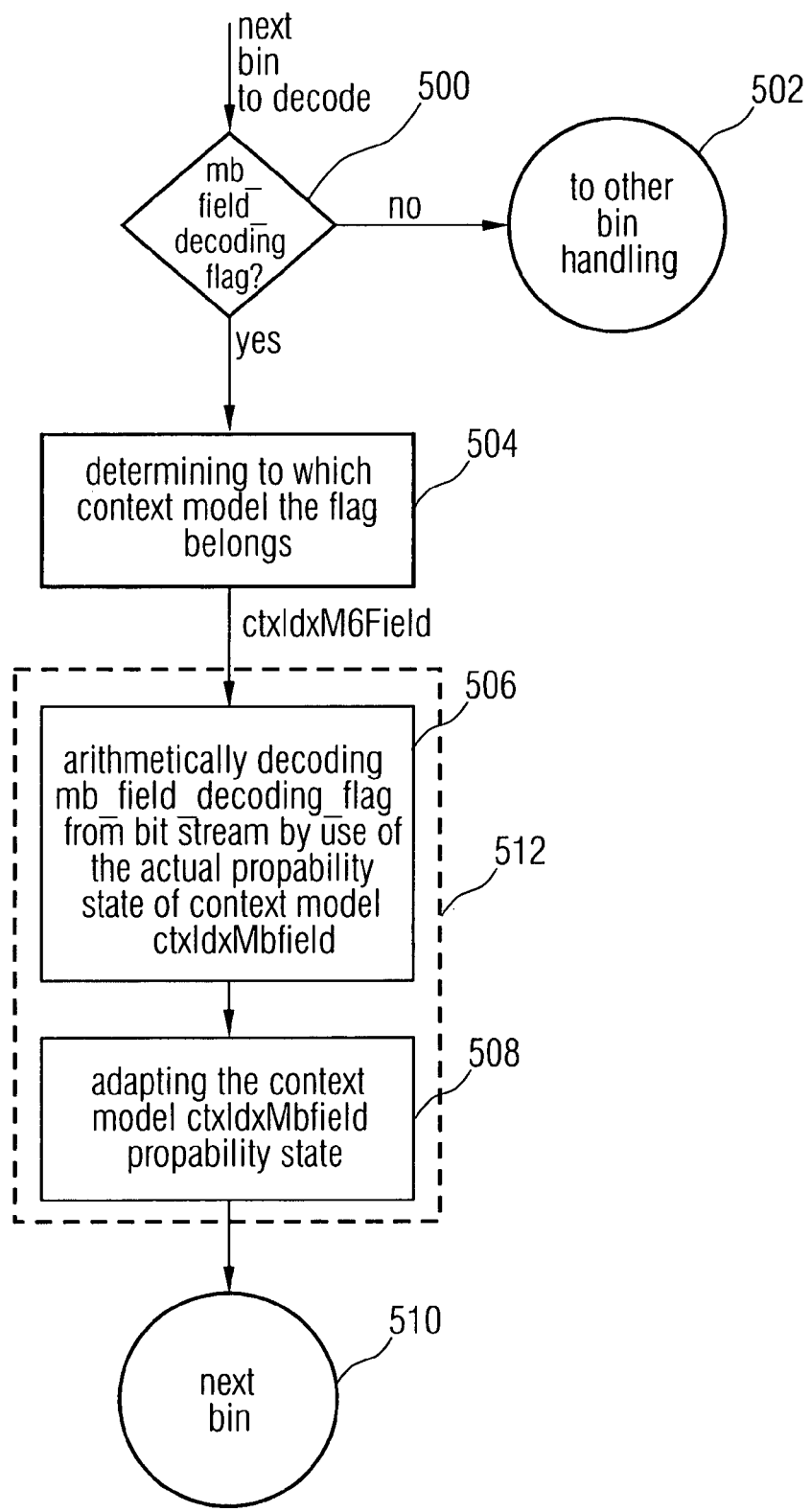

CODING OF A SYNTAX ELEMENT CONTAINED IN A PRE-CODED VIDEO SIGNAL

BACKGROUND OF THE INVENTION

I. Technical Field of the Invention

The present invention is related to coding of syntax elements contained in a pre-coded video signal into a coded bit stream and, in particular, to an arithmetic coding scheme for such syntax elements.

II. Description of the Prior Art

Entropy coders map an input bit stream of binarizations of data values to an output bit stream, the output bit stream being compressed relative to the input bit stream, i.e., consisting of less bits than the input bit stream. This data compression is achieved by exploiting the redundancy in the information contained in the input bit stream.

Entropy coding is used in video coding applications. Natural camera-view video signals show non-stationary statistical behavior. The statistics of these signals largely depend on the video content and the acquisition process. Traditional concepts of video coding that rely on mapping from the video signal to a bit stream of variable length-coded syntax elements exploit some of the non-stationary characteristics but certainly not all of it. Moreover, higher-order statistical dependencies on a syntax element level are mostly neglected in existing video coding schemes. Designing an entropy coding scheme for video coder by taking into consideration these typical observed statistical properties, however, offer significant improvements in coding efficiency.

Entropy coding in today's hybrid block-based video coding standards such as MPEG-2 and MPEG-4 is generally based on fixed tables of variable length codes (VLC). For coding the residual data in these video coding standards, a block of transform coefficient levels is first mapped into a one-dimensional list using an inverse scanning pattern. This list of transform coefficient levels is then coded using a combination of run-length and variable length coding. The set of fixed VLC tables does not allow an adaptation to the actual symbol statistics, which may vary over space and time as well as for different source material and coding conditions. Finally, since there is a fixed assignment of VLC tables and syntax elements, existing inter-symbol redundancies cannot be exploited within these coding schemes.

It is known, that this deficiency of Huffman codes can be resolved by arithmetic codes. In arithmetic codes, each symbol is associated with a respective probability value, the probability values for all symbols defining a probability estimation. A code word is coded in an arithmetic code bit stream by dividing an actual probability interval on the basis of the probability estimation in several sub-intervals, each sub-interval being associated with a possible symbol, and reducing the actual probability interval to the sub-interval associated with the symbol of data value to be coded. The arithmetic code defines the resulting interval limits or some probability value inside the resulting probability interval.

As may be clear from the above, the compression effectiveness of an arithmetic coder strongly depends on the probability estimation as well as the symbols, which the probability estimation is defined on.

SUMMARY OF THE INVENTION

It is the object of the present invention to provide a coding scheme for syntax elements contained in a pre-coded video signal, which enables a higher compression effectiveness.

In accordance with the first aspect of the present invention, this object is achieved by a method for encoding a syntax element contained in a precoded video signal into a coded bit stream, the precoded video signal representing at least one video frame, the syntax element being associated with a predetermined portion of the video frame and being indicative of as to whether the predetermined portion of the video frame is precoded in a first or a second way into the precoded video signal, the method comprising investigating as to whether a neighboring portion of the video frame neighboring the predetermined portion is precoded in the first way or the second way, in order to obtain a binary value; assigning one of at least two context models to the predetermined portion of the video frame based on the binary value, wherein each context model is associated with a different probability estimation; and arithmetically encoding the syntax element into the coded bit stream based on the probability estimation with which the assigned context model is associated.

In accordance with a second aspect of the present invention, this aspect is achieved by a method for decoding a syntax element from a coded bit stream, the syntax element being contained in a precoded video signal, the precoded video signal representing at least one video frame, the syntax element being associated with a predetermined portion of the video frame and being indicative of as to whether the predetermined portion of the video frame is precoded in a first or a second way into the precoded video signal, the method comprising investigating as to whether a neighboring portion of the video frame neighboring the predetermined portion is precoded in the first way or the second way, in order to obtain a binary value; assigning one of at least two context models to the predetermined portion of the video frame based on the binary value, wherein each context model is associated with a different probability estimation; and arithmetically decoding the syntax element from the precoded bit stream based on the probability estimation with which the assigned context model is associated.

In accordance with a third aspect of the present invention, this object is achieved by an apparatus for encoding a syntax element contained in a precoded video signal into a coded bit stream, the precoded video signal representing at least one video frame, the syntax element being associated with a predetermined portion of the video frame and being indicative of as to whether the predetermined portion of the video frame is precoded in a first or a second way into the precoded video signal, the apparatus comprising means for investigating as to whether a neighboring portion of the video frame neighboring the predetermined portion is precoded in the first way or the second way, in order to obtain a binary value; means for assigning one of at least two context models to the predetermined portion of the video frame based on the binary value, wherein each context model is associated with a different probability estimation; and means for arithmetically encoding the syntax element into the coded bit stream based on the probability estimation with which the assigned context model is associated.

In accordance with a forth aspect of the present invention, this is achieved by an apparatus for decoding a syntax element from a coded bit stream, the syntax element being contained in a precoded video signal, the precoded video signal representing at least one video frame, the syntax element being associated with a predetermined portion of the video frame and being indicative of as to whether the predetermined portion of the video frame is precoded in a first or a second way into the precoded video signal, the apparatus comprising means for investigating as to whether a neighboring portion of the video frame neighboring the predetermined portion is precoded in the first way or the second way, in order to obtain a binary value; means for assigning one of at least two context models to the predetermined portion of the video frame based on the binary value, wherein each context model is associated with a different probability estimation; and means for arithmetically decoding the syntax element from the precoded bit stream based on the probability estimation with which the assigned context model is associated.

The present invention is based on the finding that the coding of a pre-coded video signal may be rendered more compressive, when a syntax element associated with a pre-determined portion of the video frame or picture and being indicative of as to whether the pre-determined portion of the video frame is precoded in a first or a second way, i.e., a control information syntax element, is assigned to one of at least two context models, the assignment being dependent on a neighbouring portion of the video frame being pre-coded in the first or second way. The syntax element may then be arithmetically encoded into the coded bit stream based on the probability estimation with which the one context model is associated. By this measure, the dependency of the actual or real probability distribution of the syntax element on the syntax element being of the same type but associated with neighbouring portions of the video frame is exploited and the actual probability distribution can be approximated more precisely.

Thus, it is an advantage of the present invention, that, due to the more precisely adjustable probability estimation, the compression ratio of the coded bit stream to the pre-coded video signal may be enhanced.

In other words, in accordance with an embodiment of the present invention, the syntax element of a specific type may be assigned to different ones of the at least two context models each time it occurs in the pre-coded video signal. The selection of the context model is performed each time the syntax element occurs and is dependent on as to whether the neighbouring portion of the video frame is pre-coded in the first or the second way. In effect, by this measure, all the syntax elements of this type occurring in the precoded video signal are grouped into a few context model groups, each syntax element belonging to one context model group, each context model group being assigned to a different one of the context models, and each context model being associated with a different probability estimation. Therefore, each group is arithmetically coded based on a different probability estimation, namely the one belonging to the context model it is assigned to.

In accordance with another embodiment of the present invention, the probability estimation of each context model is adapted to the previously coded syntax elements, the adaption being performed separately for each context model. In other words, each syntax element just having been arithmetically coded is used to adapt the probability estimation of the context model to which this syntax element is assigned. Hence, following syntax elements of the same type and assigned to the same context model are arithmetically coded by means of an adapted probability estimation. Since, by this measure, the context models are adapted or managed independently of each other, the adaptation yields a better approximation to the actual or real probability estimation and therefore results in a better compression ratio.

In accordance with a specific embodiment of the present invention, the spatially dependent context model selection is used for coding the frame/field coding mode flags in a pre-coded video signal. The frame/field coding mode flags indicate as to whether the respective video frame portion is coded in frame or field coding mode. To be more precisely, in accordance with this embodiment, the video frame is an interlaced frame where some of its picture samples are captured at one time instant while the other picture samples are captured at a different time instant, the first picture samples being called a first field and the second picture samples being called a second field. Moreover, the video frame is spatially subdivided into an array of macroblock pairs, each macroblock pairs consisting of two macroblocks. When coded in field mode, one macroblock of a macroblock pair merely comprises the picture samples of the first field or the picture samples of the second field within that macroblock pair, while the other macroblock of that macroblock pair contains or represents the picture samples of the other field within the macroblock pair. When coded in frame mode, the macroblock contains both, first and second field picture samples, in particular, the spatially top or bottom ones within a macroblock pair, while the other macroblock of the same macroblock pair represents the other picture samples within the macroblock pair.

SHORT DESCRIPTION OF THE DRAWINGS

Preferred embodiments of the present invention are described in more detail below with respect to the figures.

FIG. 2 shows a block diagram of the entropy coding part of the coding environment of FIG. 1, in accordance with an embodiment of the present invention.

FIG. 3 shows a schematic diagram illustrating the spatial subdivision of a picture or video frame into macroblock pairs.

FIG. 4a shows a schematic diagram illustrating the frame mode.

FIG. 4b shows a schematic diagram illustrating the field mode.

FIG. 5 shows a flow diagram illustrating the encoding of the syntax element mb_field_decoding_flag in accordance with an embodiment of the present invention.

Figure 6:
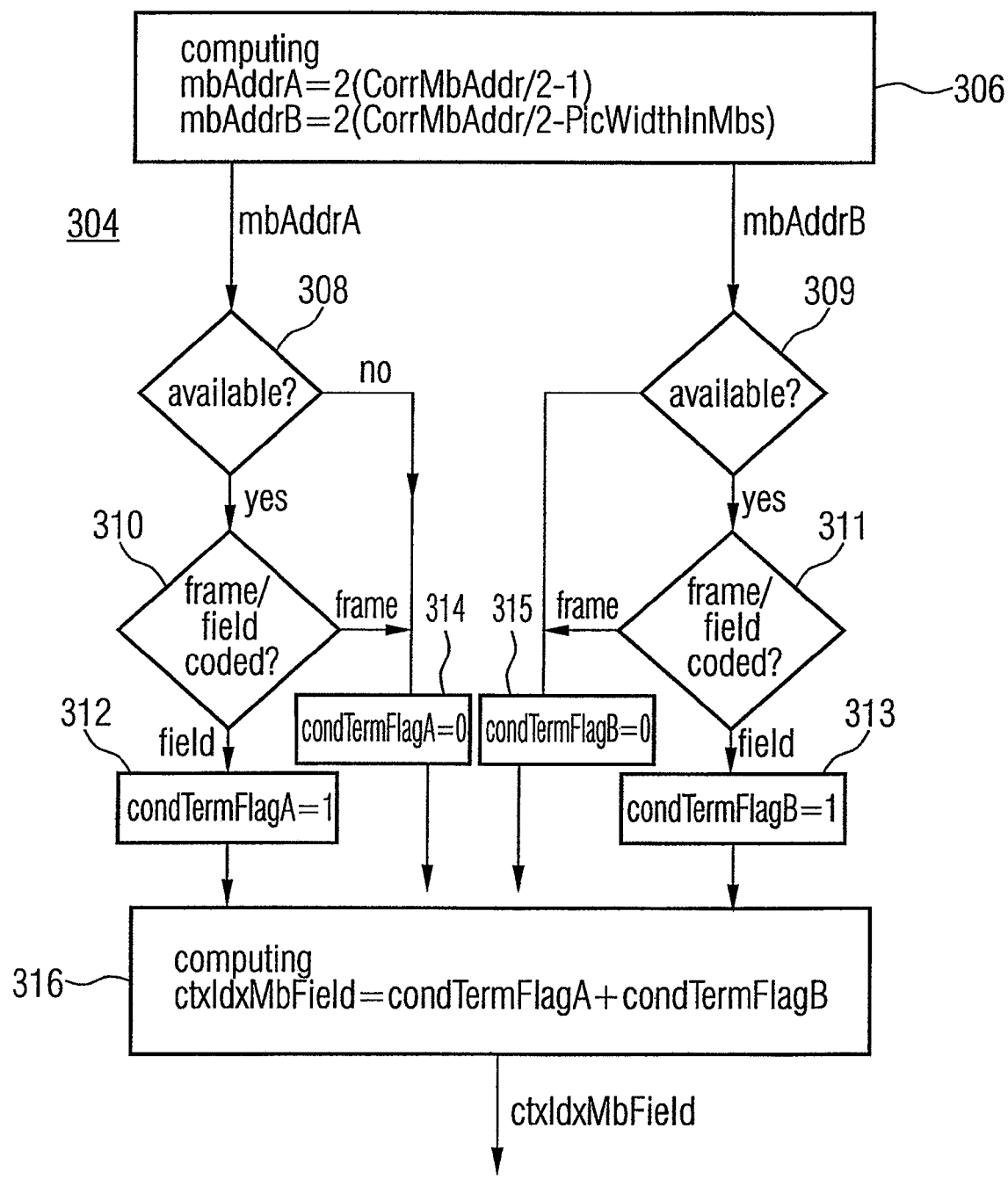

FIG. 6 a flow diagram illustrating a process of assigning context models to the mb_field_decoding_flags in accordance with an embodiment of the present invention.

FIG. 7 shows a schematic diagram illustrating the addressing scheme of the macroblocks in accordance with an embodiment of the present invention.

Figure 8:
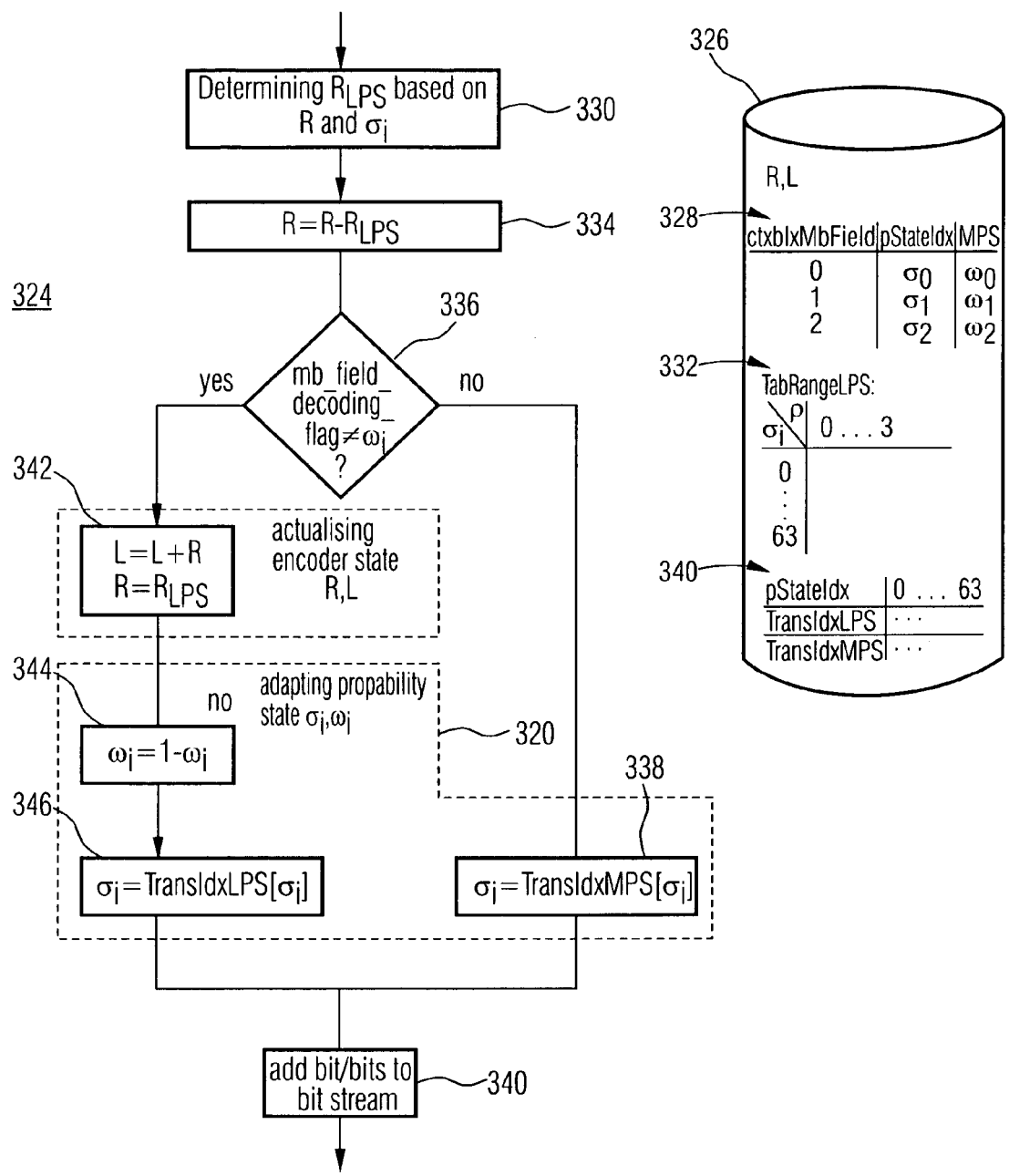

FIG. 8 a flow diagram illustrating the binary arithmetic coding of the syntax element mb_field_decoding_flag based on the context model to which it is assigned in accordance with an embodiment of the present invention.

Figure 9:
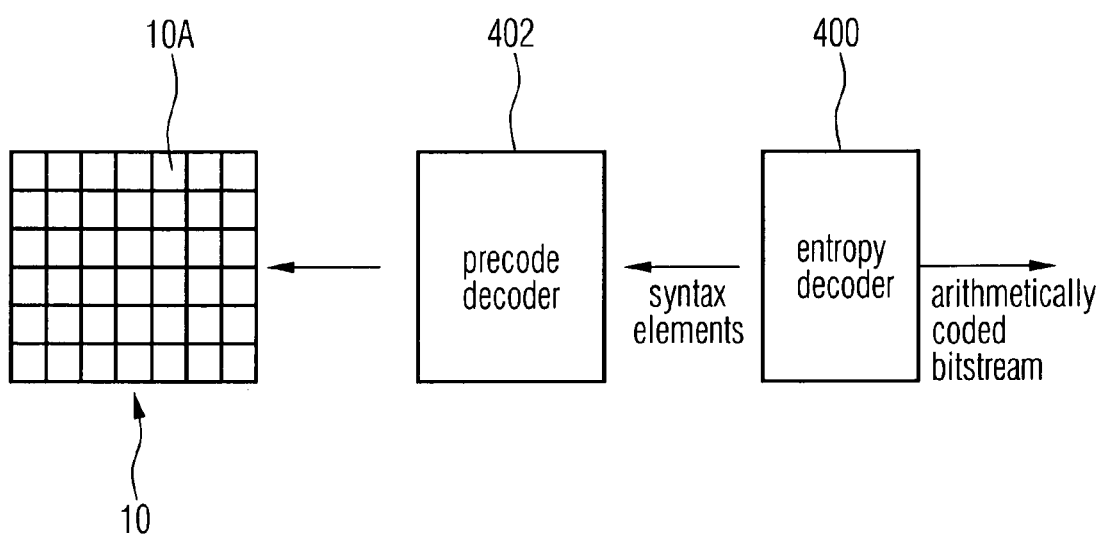

FIG. 9 shows a high-level block diagram of a decoding environment in which the present invention may be employed.

FIG. 10 shows a flow diagram illustrating the decoding of the syntax element mb_field_decoding_flag from the coded bit stream as derived by the encoding scheme of FIG. 5, in accordance with an embodiment of the present invention.

Figure 11:
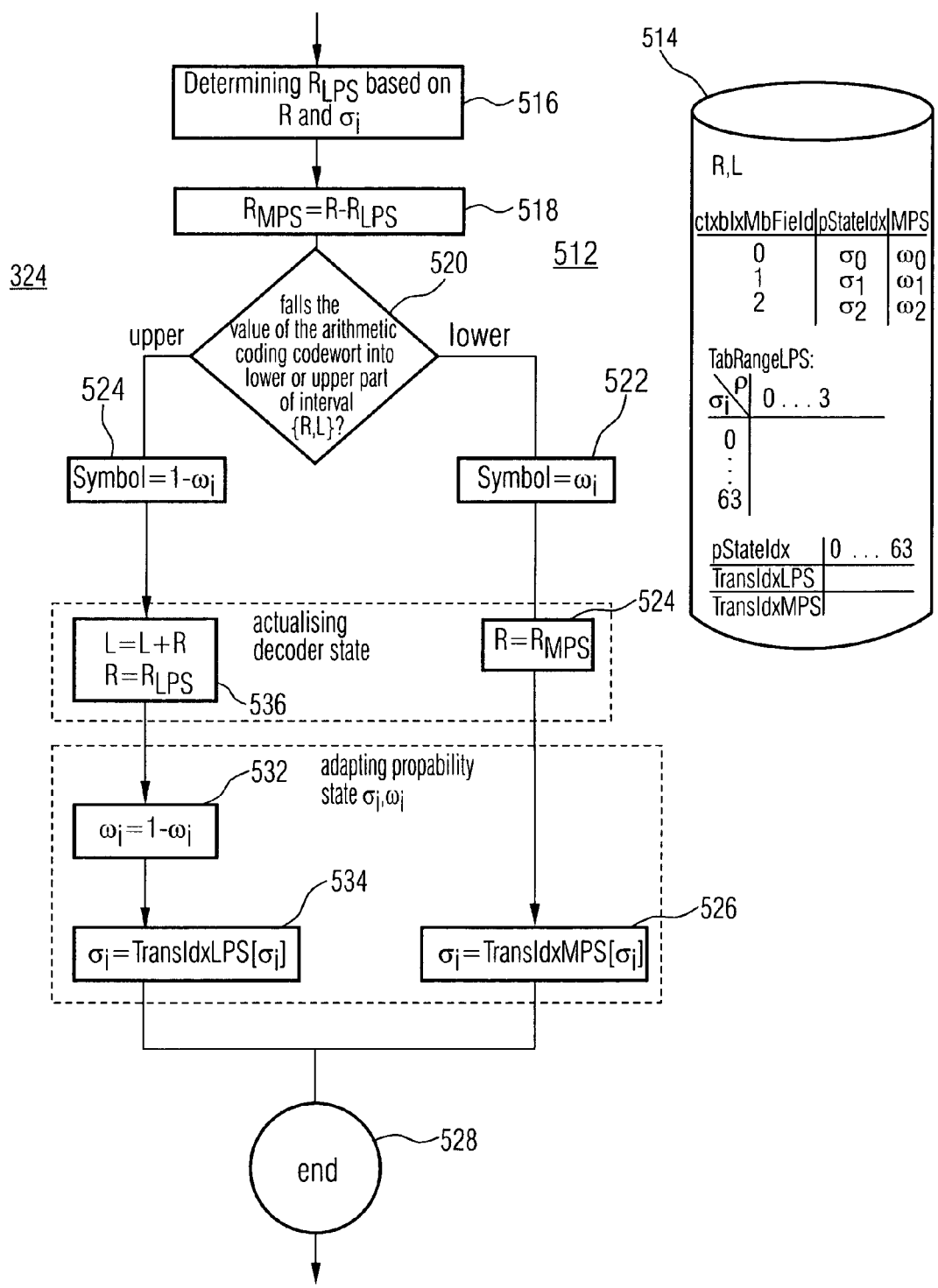

FIG. 11 shows a flow diagram illustrating the arithmetical decoding process in the decoding process of FIG. 9 in accordance with an embodiment of the present invention.

Figure 12:
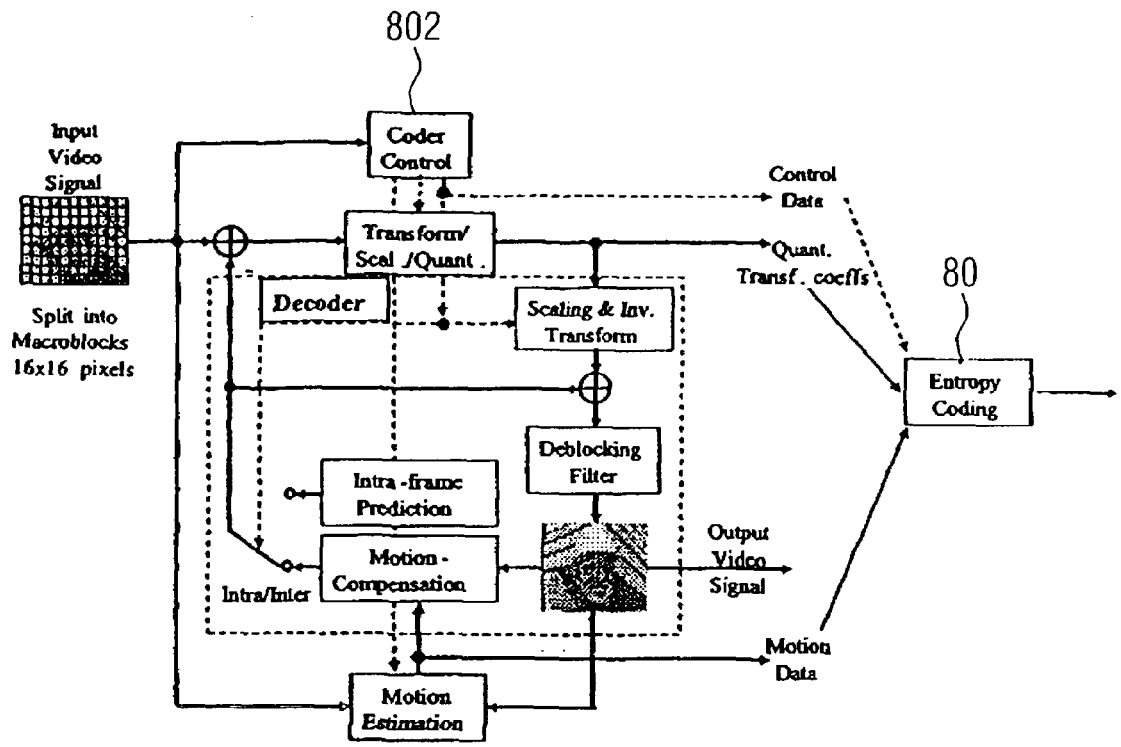

FIG. 12 shows a basic coding structure for the emerging H.264/AVC video encoder for a macroblock.

Figure 13:
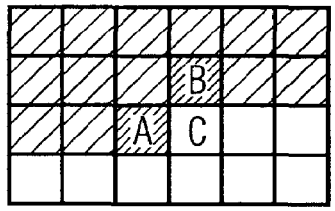

FIG. 13 illustrates a context template consisting of two neighboring syntax elements A and B to the left and on the top of the current syntax element C.

Figure 14:
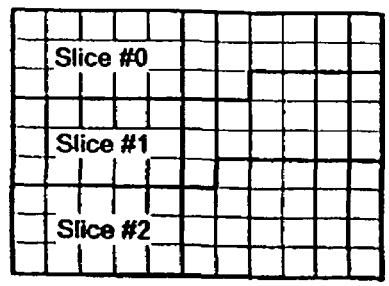

FIG. 14 shows an illustration of the subdivision of a picture into slices.

Figure 15:
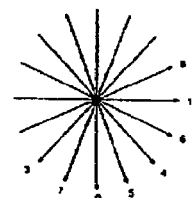

FIG. 15 shows, to the left, intra_4×4 prediction conducted for samples a-p of a block using samples A_Q, and to the right, "prediction directions for intra_4×4 prediction.

DETAILED DESCRIPTION OF PREFERRED EMBODIMENTS OF THE PRESENT INVENTION

Figure 1:
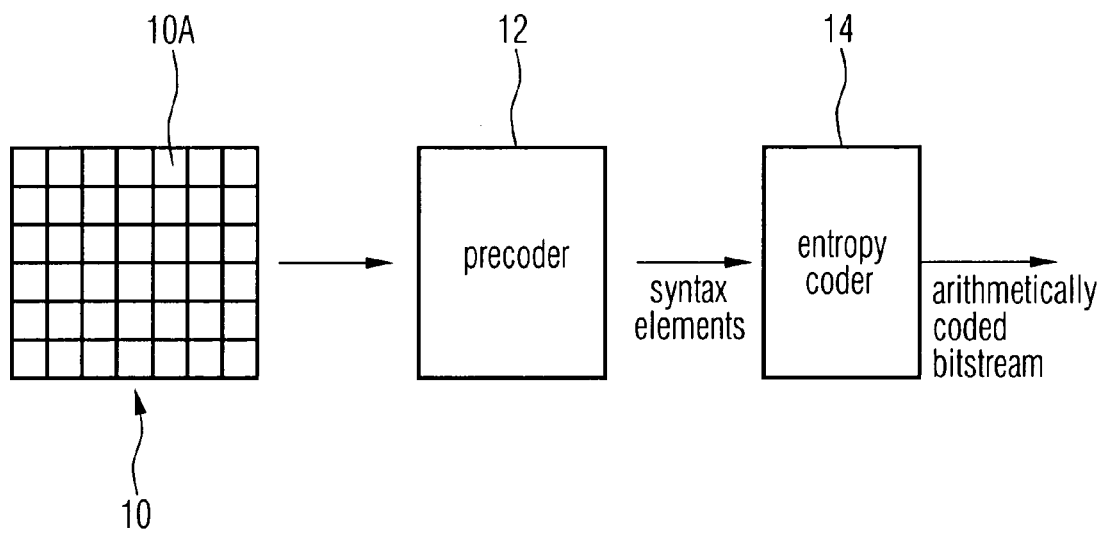
FIG. 1 shows a high-level block diagram of a coding environment in which the present invention may be employed.

FIG. 1 shows a general view of a video encoder environment to which the present invention could be applied. A picture of video frame 10 is fed to a video precoder 12. The video precoder treats the picture 10 in units of so-called macroblocks 10a. Each macroblock contains several picture samples of picture 10. On each macroblock a transformation into transformation coefficients is performed followed by a quantization into transform coefficient levels. Moreover, intra-frame prediction or motion compensation is used in order not to perform the afore mentioned steps directly on the pixel data but on the differences of same to predicted pixel values, thereby achieving small values which are more easily compressed.

Precoder 12 outputs the result, i.e., the precoded video signal. All residual data elements in the precoded video signal, which are related to the coding of transform coefficients, such as the transform coefficient levels or a significance map indicating transform coefficient levels skipped, are called residual data syntax elements. Besides these residual data syntax elements, the precoded video signal output by precoder 12 contains control information syntax elements containing control information as to how each macroblock has been coded and has to be decoded, respectively. In other words, the syntax elements are dividable into two categories. The first category, the control information syntax elements, contains the elements related to a macroblock type, sub-macroblock type, and information on prediction modes both of a spatial and of temporal types as well as slice-based and macroblock-based control information, for example. In the second category, all residual data elements such as a significance map indicating the locations of all significant coefficients inside a block of quantized transform coefficients, and the values of the significant coefficients, which are indicated in units of levels corresponding to the quantizations steps, are combined, i.e., the residual data syntax elements.

The macroblocks into which the picture 10 is partitioned are grouped into several slices. In other words, the picture 10 is subdivided into slices. An example for such a subdivision is shown in FIG. 13, in which each block or rectangle represents a macroblock. For each slice, a number of syntax elements are generated by precoder 12, which form a coded version of the macro blocks of the respective slice.

The precoder 12 transfers the syntax elements to a final coder stage 14, which is an entropy coder and explained in more detail with respect to FIG. 2. The final coder stage 14 generates an arithmetic codeword for each slice. When generating the arithmetic codeword for a slice, the final coding stage 14 exploits the fact that each syntax element is a data value having a certain meaning in the video signal bit stream that is passed to the entropy coder 14. The entropy coder 14 outputs a final compressed arithmetic code video bit stream comprising arithmetic codewords for the slices of picture 10.

FIG. 2 shows the arrangement for coding the syntax elements into the final arithmetic code bit stream, the arrangement generally indicated by reference number 100. The coding arrangement 100 is divided into three stages, 100a, 100b, and 100c.

The first stage 100a is the binarization stage and comprises a binarizer 102. An input of the binarizer 102 is connected to an input 104 of stage 100a via a switch 106. At the same time, input 104 forms the input of coding arrangement 100. The output of binarizer 102 is connected to an output 108 of stage 100a, which, at the same time, forms the input of stage 100b. Switch 106 is able to pass syntax elements arriving at input 104 to either binarizer 102 or binarization stage output 108, thereby bypassing binarizer 102.

The function of switch 106 is to directly pass the actual syntax element at input 104 to the binarization stage output 108 if the syntax element is already in a wanted binarized form. Examples for syntax elements that are not in the correct binarization form, called non-binary valued syntax elements, are motion vector differences and transform coefficient levels. An example for a syntax element that has not to be binarized since it is already a binary value is the MBAFF (MBAFF=Macroblock Adaptive Frame/Field) Coding mode flag to be described later in more detail.

The non-binary valued syntax elements are passed via switch 106 to binarizer 102. Binarizer 102 maps the non-binary valued syntax elements to a codeword, or a so-called bin string, so that they are now in a binary form. The term "bin" means the binary decision that have to be made at a node of a coding tree defining the binarization mapping of a non-binary value to a bit string or codeword, when transitioning from the route note of the coding tree to the leaf of the coding tree corresponding to the non-binary value of the non-binary syntax element to be binarized. Thus, a bin string is a sequence of bins or binary decisions and corresponds to a codeword having the same number of bits, each bit being the result of a binary decision.

The bin strings output by binarizer 102 may not be passed directly to binarization stage output 108 but controllably passed to output 108 by a bin loop over means 110 arranged between the output of binarizer 102 and output 108 in order to merge the bin strings output by binarizer 102 and the already binary valued syntax elements bypassing binarizer 102 to a single bit stream at binarization stage output 108.

Thus, the binarization stage 108 is for transferring the syntax elements into a suitable binarized representation. The binarization procedure in binarizer 102 preferably yields a binarized representation which is adapted to the probability distribution of the syntax elements so as to enable very efficient binary arithmetic coding.

Stage 100b is a context modelling stage and comprises a context modeller 112 as well as a switch 113. The context modeller 112 comprises an input, an output, and an optional feedback input. The input of context modeller 112 is connected to the binarization stage output 108 via switch 113. The output of context modeller 112 is connected to a regular coding input terminal 114 of stage 100c. The function of switch 113 is to pass the bits or bins of the bin sequence at binarization stage output 108 to either the context modeller 112 or to a bypass coding input terminal 116 of stage 100c, thereby bypassing context modeller 112.

The aim of switch 113 is to ease the subsequent binary arithmetic coding performed in stage 100c. To be more precise, some of the bins in the bin string output by binarizer 102 show heuristically nearly an equi-probable distribution. This means, the corresponding bits are, with a probability of nearly 50%, 1 and, with a probability of nearly 50%, 0, or, in other words, the bits corresponding to this bin in a bin string have a 50/50 chance to be 1 or 0. These bins are fed to the bypass-coding input terminal 116 and are binary arithmetically coded by use of an equi-probable probability estimation, which is constant and, therefore, needs no adaption or updating overhead. For all other bins, has been heuristically determined that the probability distribution of these bins depends on other bins as output by stage 100a so that it is worthwhile to adapt or update the probability estimation used for binary arithmetically coding of the respective bin as it will be described in more detail below exemplarily with respect to the syntax element mb_field_decoding_flag. The latter bins are thus fed by switch 113 to the input terminal of context modeller 112.

Context modeller 112 manages a set of context models. For each context model, the context modeller 112 has stored an actual bit or bin value probability distribution estimation. For each bin that arrives at the input of context modeller 112, the context modeller 112 selects one of the sets of context models. In other words, the context modeller 112 assigns the bin to one of the set of context models. The assignment of bins to a context model is such that the actual probability distribution of bins belonging to the same context model show the same or likewise behaviour so that the actual bit or bin value probability distribution estimation stored in the context modeller 112 for a certain context model is a good approximation of the actual probability distribution for all bins that are assigned to this context model.

When having assigned the context model to an incoming bin the context modeller 112 passes the bin further to arithmetical coding stage 100c together with the probability distribution estimation of the context model, which the bin is assigned to. By this measure, the context modeller 112 drives the arithmetical coding stage 100c to generate a sequence of bits as a coded representation of the bins input in context modeller 112 by switch 113 according to the switched bit value probability distribution estimations as indicated by the context modeller 112.

Moreover, the context modeller 112 continuously updates the probability distribution estimations for each context model in order to adapt the probability distribution estimation for each context model to the property or attributes of the picture or video frame from which the syntax elements and bins have been derived. The estimation adaptation or estimation update is based on past or prior bits or bin values which the context modeller 112 receives at the feedback input over a feedback line 117 from stage 100c or may temporarily store. Thus, in other words, the context modeller 112 updates the probability estimations in response to the bin values passed to arithmetical coding stage 100c. To be more precise, the context modeller 112 uses a bin value assigned to a certain context model merely for adaptation or update of the probability estimation that is associated with the context model of this bin value.

As will be described in more detail with respect to the syntax element mb_field_decoding_flag, when the same bin or same syntax element occurs several times in the bins passed from stage 100a it may be assigned to different of the context models depending on previously incoming or previously arithmetically coded bins.

It is clear from the above, that the probability estimation used for binary arithmetically coding determines the code and its efficiency in the first place, and that it is of paramount importance to have an adequate model that exploits the statistical dependencies of the syntax elements and bins to a large degree so that the probability estimation is always approximating very effectively the actual probability distribution during encoding.

The third stage 100c of coding arrangement 100 is the arithmetic coding stage. It comprises a regular coding engine 118, a bypass-coding engine 120, and a switch 122. The regular coding engine 118 comprises an input and an output terminal. The input terminal of regular coding engine 118 is connected to the regular coding input terminal 114. The regular coding engine 118 binary arithmetically codes the bin values passed from context modeler 112 by use of the context model also passed from context modeler 112 and outputs coded bits. Further, the regular coding engine 118 passes bin values for context model updates to the feedback input of context modeler 112 over feedback line 117.

The bypass-coding engine 120 has also an input and an output terminal, the input terminal being connected to the bypass coding input terminal 116. The bypass-coding engine 120 is for binary arithmetically coding the bin values passed directly from binarization stage output 108 via switch 113 by use of a static predetermined probability distribution estimation and also outputs coded bits.

The coded bits output from regular coding engine 118 and bypass coding engine 120 are merged to a single bit stream at an output 124 of coding arrangement 100 by switch 122, the bit stream representing a binary arithmetic coded bit stream of the syntax elements as input in input terminal 104. Thus, regular coding engine 118 and bypass coding 120 cooperate in order to bit wise perform arithmetical coding based on either an adaptive or a static probability distribution model.

After having described with respect to FIGS. 1 and 2 rather generally the operation of coding arrangement 100, in the following its functioning is described in more detail with respect to the handling of the syntax element mb_field_decoding_flag in accordance with embodiments of the present invention. In order to do so, firstly, with regard to FIGS. 3 to 4b, the meaning of this flag is explained.

FIG. 3 shows a picture of decoded video frame 10. The video frame 10 is spatially partitioned into macroblock pairs 10b. The macroblock pairs are arranged in an array of rows 200 and columns 202. Each macroblock pair consists of two macroblocks 10a.

In order to be able to address each macroblock 10a, a sequence is defined with respect to macroblocks 10a. In order to do so, in each macroblock pair, one macroblock is designated the top macroblock whereas the other macroblock in the macroblock pair is designated the bottom macroblock, the meaning of top and bottom macroblock depending on the mode by which a macroblock pair is coded by precoder 12 (FIG. 1) as will be described with respect to FIGS. 4a and 4b. Thus, each macroblock pair row 200 consists of two macroblock rows, i.e., an top macroblock row 200a consisting of the top macroblocks in the macroblock pairs of the macroblock pair line 200 and a bottom macroblock row 200b comprising the bottom macroblocks of the macroblock pairs.

In accordance with the present example, the top macroblock of the top left macroblock pair resides at address zero. The next address, i.e. address 1, is assigned to the bottom macroblock of the top left macroblock pair. The addresses of the top macroblocks of the macroblock pairs in the same, i.e., top macroblock row 200a, are 2, 4, . . . , 2i-2, with the addresses rising from left to right, and with i expressing the picture width in units of macroblocks or macroblock pairs. The addresses 1, 3, . . . , 2i-1 are assigned to the bottom macroblocks of the macroblock pairs in the top macroblock pair row 200, the addresses rising from left to right. The next 2i-addresses from 2i to 4i-1 are assigned to the macroblocks of the macroblock pairs in the next macroblock pair row from the top and so on, as illustrated in FIG. 3 by the numbers written into the boxes representing the macroblocks 10a and by the arched rows.

It is emphasized that FIG. 3 does show the spatial subdivision of picture 10 in units of macroblock pairs rather than in macroblocks. Each macroblock pair 10b represents a spatial rectangular region of the pictures. All picture samples or pixels (not shown) of picture 10 lying in the spatial rectangular region of a specific macroblock pair 10b belong to this macroblock pair. If a specific pixel or picture sample belongs to the top or the bottom macroblock of a macroblock pair depends on the mode by which precoder 12 has coded the macroblocks in that macroblock pair as it is described in more detail below.

FIG. 4a shows on the left hand side the arrangement of pixels or picture samples belonging to a macroblock pair 10b. As can be seen, the pixels are arranged in an array of rows and columns. Each pixel shown is indicated by a number in order to ease the following description of FIG. 4a. As can be seen in FIG. 4a, some of the pixels are marked by an "x" while the others are marked ▣". All pixels marked with "x" belong to a first field of the picture while the other pixels marked with ▣" belong to a second field of the picture. Pixels belonging to the same field are arranged in alternate rows of the picture. The picture or video frame can be considered to contain two interleaved fields, a top and a bottom field. The top field comprises the pixels marked with ▣" and contains even-numbered rows 2n+2, 2n+4, 2n+6, . . . with 2n being the number of rows of one picture or video frame and n being an integer greater than or equal to 0. The bottom field contains the odd-numbered rows starting with the second line of the frame.

It is assumed that the video frame to which macroblock pair 10b belongs, is an interlaced frame where the two fields were captured at different time instants, for example the top field before the bottom field. It is now that the pixels or picture samples of a macroblock pair are differently assigned to the top or bottom macroblock of the macroblock pair, depending on the mode by which the respective macroblock pair is precoded by precoder 12 (FIG. 1). The reason for this being the following.

As described above with respect to FIG. 1, the picture samples of a macroblock, which may be luminance or luma and chrominance or chroma samples, may be either spatially or temporarily predicted by precoder 12, and the resulting prediction residual is encoded using transform coding in order to yield the residual data syntax elements. It is now that in interlaced frames (and it is assumed that the present video frame is an interlaced frame), with regions of moving objects or camera motion, two adjacent rows of pixels tend to show a reduced degree of statistical dependency when compared to progressive video frames in which both fields are captured at the same time instant. Thus, in cases of such moving objects or camera motion, the pre-coding performed by precoder 12 which, as stated above, operates on macroblocks, may achieve merely a reduced compression efficiency when a macroblock pair is spatially sub-divided into a top macroblock representing the top half region of the macroblock pair and a bottom macroblock representing the bottom half region of the macroblock pair, since in this case, both macroblocks, the top and the bottom macroblock, comprise both top field and bottom field pixels. In this case, it may be more efficient for precoder 12 to code each field separately, i.e., to assign top field pixels to the top macroblock and bottom field pixels to the bottom field macroblock.

In order to illustrate as to how the pixels of a macroblock pair are assigned to the top and bottom macroblock of the, FIGS. 4a and 4b show on the right hand side the resulting top and bottom macroblock in accordance with the frame and field mode, respectively.

FIG. 4a represents the frame mode, i.e., where each macroblock pair is spatially subdivided in a top and a bottom half macroblock. FIG. 4a shows at 250 the top macroblock and at 252 the bottom macroblock as defined when they are coded in the frame mode, the frame mode being represented by double-headed arrow 254. As can be seen, the top macroblock 250 comprises one half of the pixel samples of the macroblock pair 10b while the other picture samples are assigned to the bottom macroblock 252. To be more specific, the picture samples of the top half rows numbered 2n+1 to 2n+6 belong to the top macroblock 250, whereas the picture samples 91 to 96, 101 to 106, 111 to 116 of the bottom half comprising rows 2n+7 to 2n+12 of the macroblock pair 10b (with merely 2n+10 to 2n+12 being shown in FIG. 4a) belong to the bottom macroblock 252. Thus, when coded in frame mode, both macroblocks 250 and 252 comprise both, picture elements of the first field marked with "x" and captured at a first time instant and picture samples of the second field marked with ▣" and captured at a second, different time instant.

The assignment of pixels as they are output by a camera or the like, to top or bottom macroblocks is slightly different in field mode. When coded in field mode, as is indicated by double headed arrow 256 in FIG. 4b, the top macroblock 250 of the macroblock pair 10b contains all picture samples of the top field, marked with "x", while the bottom macroblock 252 comprises all picture samples of the bottom field, marked with ▣". Thus, when coded in accordance with field mode as illustrated by double-headed arrow 256, each macroblock in a macroblock pair does merely contain either picture samples of the top field or picture samples of the bottom field rather than a mix of picture samples of the top and bottom field.

Now, after having described the spatial sub-division of a picture into macroblock pairs and the assignment of picture samples in a macroblock pair to either the top or the bottom macroblock of the macroblock pair, the assignment depending on the mode by which the macroblock pair or the macroblocks of the macroblock pair are coded by precoder 12, reference is again made to FIG. 1 in order to explain the function and meaning of the syntax element mb_field_decoding_flag contained in the precoded video signal output by precoder 12.

When the precoder 12 receives a video signal representing an interlaced video frame, precoder 12 is free to make the following decisions when coding the video frame 10:

1. It can combine the two fields together to code them as one single coded frame, so that each macroblock pair and each macroblock would be coded in frame mode.
2. Alternatively, it could combine the two fields and code them as separate coded fields, so that each macroblock pair and each macroblock would be coded in field mode.

3. As a last option, it could combine the two fields together and compress them as a single frame, but when coding the frame it splits the macroblock pairs into either pairs of two field macroblocks or pairs of two frame macroblocks before coding them.

The choice between the three options can be made adaptively for each frame in a sequence. The choice between the first two options is referred to as picture adaptive frame/field (PAFF) coding. When a frame is coded as two fields, each field is partitioned into macroblocks and is coded in a manner very similar to a frame.

If a frame consists of mixed regions where some regions are moving and others are not, it is typically more efficient to code the non-moving regions in frame mode and the moving regions in the field mode. Therefore, the frames/field encoding decision can be made independently for each vertical pair of macroblocks in a frame. This is the third coding option of the above-listed options. This coding option is referred to as macroblock adaptive frame/field (MBAFF) coding. It is assumed in the following that precoder 12 decides to use just this option. As described above, MBAFF coding allows the precoder to better adapt the coding mode type (field or frame mode) to the respective areas of scenes. For example, precoder 12 codes macroblock pairs located at stationary areas of a video scene in frame mode, while coding macroblock pairs lying in areas of a scene showing fast movements in field mode.

As mentioned above, for a macroblock pair that is coded in frame mode, each macroblock contains frame lines. For a macroblock pair that is coded in field mode, the top macroblock contains top field lines and the bottom macroblock contains bottom field lines. The frame/field decision for each macroblock pair is made at the macroblock pair level by precoder 12, i.e. if the top macroblock is field coded same applies for the bottom macroblock within same macroblock pair. By this measure, the basic macroblock processing structure is kept intact, and motion compensation areas are permitted to be as large as the size of a macroblock.

Each macroblock of a field macroblock pair is processed very similarly to a macroblock within a field in PAFF coding. However, since a mixture of field and frame macroblock pairs may occur within an MBAFF frame, some stages of the pre-coding procedure in precoder 12, such as the prediction of motion vectors, the prediction of intra prediction modes, intra frame sample prediction, deblocking filtering and context modelling in entropy coding and the zig-zag scanning of transform coefficients are modified when compared to the PAFF coding in order to account for this mixture.

To summarize, the pre-coded video signal output by precoder 12 depends on the type of coding precoder 12 has decided to use. In case of MBAFF coding, as it is assumed herein, the precoded video signal contains a flag mb_field_decoding_flag for each non-skipped macroblock pair. The flag mb_field_decoding_flag indicates for each macroblock pair it belongs to whether the corresponding macroblocks are coded in frame or field coding mode. On decoder side, this flag is necessary in order to correctly decode the precoded video signal. In case, the macroblocks of a macroblock pair are coded in frame mode, the flag mb_field_decoding_flag is zero, whereas the flag is one in the other case.

Now, while the general mode of operation of the original decoder arrangement of FIG. 2 has been described without referring to a special bin, with respect to FIG. 5, the functionality of this arrangement is now described with respect to the binary arithmetic coding of the flag mb_field_decoding_flag.

The process shown in FIG. 5 starts at the time, when the flag mb_field_decoding_flag arrives at the input of the context modeller 112. In a first step 300 context modeller 112 determines as to whether the incoming syntax element or bin is the mb_field_decoding_flag. If not, context modeller 112 switches to another syntax element handling procedure or subroutine at step 302. If the incoming bin is an mb_field_decoding_flag the context modeller 112 determines in step 304 as to which context model the flag belongs to.

Step 304 is shown in more detail in FIG. 6. When determining the context model corresponding to the current mb_field_decoding_flag, context modeller 112 first computes, in step 306, the addresses of the top macroblock of the macroblock pair to the left and above the current macroblock pair. In order to illustrate the spatial relationships, in FIG. 7 a portion of six macroblock pairs of a video frame is shown, wherein each rectangle region in FIG. 7 corresponds to one macroblock and the first and the second two vertically adjacent macroblocks in each column form a macroblock pair.

In FIG. 7, CurrMbAddr denotes the macroblock address of the top macroblock of the current macroblock pair, the current flag mb_field_decoding_flag is associated with. The current macroblock pair is indicated by bold lines. mbAddrA and mbAddrB denote the addresses of the top macroblocks of the macroblock pairs to the left and above the current macroblock pair, respectively.

In order to compute the addresses of the top macroblock of the neighbouring macroblock pair to the left and above the current macroblock pair, context modeller 112 computes $$\text{mbAddr}A = 2*(\text{CurrMbAddr}/2 - 1)$$

$$\text{mbAddr}B = 2*(\text{CurrMbAddr}/2 - \text{PicWidthInMbs})$$

where PicWidthInMbs specifies the picture width in units of macroblocks. The equations given above can be understood by looking at FIG. 3. It is noted that in FIG. 3 the picture width in units of macroblocks has been denoted i. It is further noted that the equations given above are also true when the current macroblock address CurrMbAddr is interchanged with the odd-numbered macroblock address of the bottom macroblock of the current macroblock pair, i.e., CurrMbAddr+1, because in the equations above, "/" denotes an integer division with truncation of the result toward zero. For example, 7/4 and −7/−4 are truncated to 1 and −7/4 and 7/−4 are truncated to −1.

In the next steps 308 and 309, context modeller 112 determines the availability of the top macroblock of the macroblock pair to the left and above the current macroblock pair, respectively. In step 308, the neighbouring macroblock A to the left, is marked as available, when mbAddrA is smaller than 0. The same applies for step 309 with respect to mbAddrB. Thus, MbAddrN, with N being either A or B, are the addresses of the top macroblocks of the respective neighbouring macroblock pair in case the macroblock pair does really exist and denotes concurrently the availability status of the respective neighbouring macroblock pair A and B, respectively.

In an alternative embodiment, the macroblock A or B is only marked as available, when additionally to the above condition the following is true: The macroblock with address mbAddrN belongs to same slice as the current slice.

When in step 308/309 it is determined that macroblock N, with N being either A or B, is marked as available, in step 310 and step 311, respectively, it is determined as to whether macroblock N (N being equal to A or B) is a macroblock coded in field mode or a macroblock coded in frame mode. In case macroblock A is coded in field mode a flag cond-TermflagA is set to 1 in step 312. The same applies for macroblock B so that condTermflagB is set to 1 in step 313 if macroblock B is coded in field mode. In all other cases, i.e., when mbAddrA is smaller than 0 (308) or macroblock A is coded in frame mode (310), the flag condTermFlagA is set to 0 in step 314. Accordingly, when mbAddrB is smaller than 0 (309) or macroblock B is coded in frame mode (311), the flag condTermFlagB is set to 0 in step 315.

CondTermFlagA and condTermFlagB are used in step 316 by context modeller 112 to compute context index ctxIdxMbField indicating the probability model to be used for binary arithmetic coding of mb_field_decoding_flag. In particular, context modeller computes $$ctxIdxMbField = condTermFlagA + condTermFlagB,$$

the result being a number of {0,1,2}.

Referring back to FIG. 5, after the determination in step 304, context modeller 112 passes the variable ctxIdxMbField (context index macroblock field) or the probability estimation status indexed by ctxIdxMbField along with mb_field_decoding_flag to regular coding engine 118. Based on these inputs, the regular coding engine 118 arithmetically encodes, in step 318, the flag mb_field_decoding_flag into the bit stream 124 by using the current probability state of the context model as indexed by ctxIdxMbField.

Thereafter, regular coding engine 118 passes the bin value of mb_field_decoding_flag via path 117 back to context modeller 112, whereupon context modeller 112 adapts, in step 320, the context model indexed by ctxIdxMbField with respect to its probability estimation state. Thereafter the process of coding the flag mb_field_decoding_flag into the bit stream at the output 124 ends at 322.

The steps 318 and 320, encompassed by dotted line 324 in FIG. 5, are explained in more detail with respect to FIG. 8.

FIG. 8 shows, on the left hand side, a flow diagram of the process 324. On the right hand side, FIG. 8 shows a memory 326 to which both, the context modeller 112 and the regular coding engine 118, have access in order to load, write, and update specific variables. These variables comprise R and L, which define the current state or current probability interval of the binary arithmetical coder 100*c*. In particular, R denotes the current interval range R, while L denotes the base or lower end point of current probability interval. Thus, the current interval of the binary arithmetic coder 100*c* extends from L to L+R.

Furthermore, memory 326 contains a table 328, which associates each possible value of ctxIdxMbField, i.e. 0, 1, 2, a pair of a probability state index σ and an MPS value ω, both defining the current probability estimation state of the respective context model indexed by the respective context index ctxIdxMbField. The probability state σ is an index that uniquely identifies one of a set of possible probability values $p_\sigma$. The probability values $p_\sigma$ are an estimation for the probability of the next bin of that context model to be a least probable symbol (LPS). Which of the possible bin values, i.e., a null or one, is meant by the LPS, is indicated by the value of MPS ω. If ω is 1, LPS is 0 and vice-versa. Thus, the state index and MPS together uniquely define the actual probability state or probability estimation of the respective context model. Both variables divide the actual interval L to L+A into two sub-intervals, namely the first sub-interval running from L to L+R $p_\sigma$ and the second interval running from L+R $p_\sigma$ to L+R. The first or lower sub-interval corresponds to the least probable symbol whereas the upper sub-interval corresponds to the most probable symbol. Exemplary values for $p_\sigma$ are derivable from the following recursive equation, with α being a value between about 0.8 to 0.99, and preferably being $\alpha = (0.01875/0.5)^{1/63}$ and σ being an integer from 1 to 63: $p_\sigma = \alpha \cdot p_{\sigma-1}$, for all σ=1, ..., 63.

Now in a first step 330, the range $R_{LPS}$ of the lower subinterval is determined based on R and the probability state corresponding to the chosen context model indexed by ctxIdxMbField, later on called simply $\sigma_i$, with i being equal to ctxIdxMbField. The determination in step 330 may comprise a multiplication of R with $p_{\sigma i}$. Nevertheless, in accordance with an alternative embodiment, the determination in step 330 could be conducted by use of a table, which assigns to each possible pair of probability state index $\sigma_i$ and a variable ρ a value for $R_{LPS}$, such a table being shown at 332. The variable ρ would be a measure for the value of R in some coarser units then a current resolution by which R is represented.

After having determined $R_{LPS}$, in step 334, regular coding engine 118 amends R to be $R-R_{LPS}$, i.e., to be the range of the lower sub-interval.

Thereafter, in step 336, the regular coding engine 118 checks as to whether the value of the actual bin mb_field_decoding_flag is equal to the most probable symbol as indicated by $\omega_i$ or not. If mb_field_decoding_flag is the MPS, L needs not to be updated and the process transitions to step 338, where context modeller 112 updates the probability estimation state of the current context model by updating $\sigma_i$. In particular, context modeller 112 uses a table 340 which associates each probability state index σ with an updated probability state index in case the actual symbol or bin was the most probable symbol, i.e., σ becomes transIdxMPS($\sigma_i$).

After step 338, the process ends at 340 where bits or a bit are added to the bit stream if possible. To be more specific, a bit or bits are added to the bit stream in order to indicate a probability value falling into the current interval as defined by R and L. In particular, step 340 is performed such that at the end of a portion of the arithmetic coding of a precoded video signal, such as the end of a slice, the bit stream defines a codeword defining a value that falls into the interval R and L, thereby uniquely identifying to the decoder the bin values having been encoded into the codeword. Preferably, the codeword defines the value within the current interval having the shortest bit length. As to whether a bit or bits are added to the bit stream in step 340 or not, depends on the fact as to whether the value indicated by the bit stream will remain constant even if the actual interval is further subdivided with respect to subsequent bins, i.e. as to whether the respective bit of the representation of the value falling in the current interval does not change whatever subdivisions will come.

If in step 336 it is determined that mb_field_decoding_flag is the least probable symbol LPS, the regular coding engine 118 actualizes the current encoder state R and L in step 342 by amending L to be L+R and R to be $R_{LPS}$. Then, in step 344, the value MPS is updated by computing $\omega_i = 1-\omega_i$. Thereafter, in step 346, the probability state index is actualised by use of table 340, which also associates each current probability state index with an updated probability state index in case the actual bin value is the least probable symbol, i.e., amending $\sigma_i$ to become transIdxLPS($\sigma_i$). After the probability state index $\sigma_i$ and $\omega_i$ has been adapted in steps 344 and 346, the process steps to step 340 which has already been described.

After having described how to encode bit flag mb_field_decoding_flag into an arithmetically coded bit stream, the decoding of said bit stream and the retrieval of the flag is described with respect to FIGS. 9 to 11.

FIG. 9 shows a general view of a video decoder environment to which the present invention could be applied. An entropy decoder 400 receives the arithmetically coded bit stream as described above and treats it as will be described in more detail below with respect to FIGS. 10 and 11. In particular, the entropy decoder 400 decodes the arithmetically coded bit stream by binary arithmetic decoding in order to obtain the precoded video signal and, in particular, syntax elements contained therein and passes same to a precode decoder 402. The precode decoder 402 uses the syntax elements, such as motion vector components and flags, such as the mb_field_decoding_flag, in order to retrieve, macroblock after macroblock and then slice after slice, the picture samples of pixels of the video frames 10.

FIG. 10 shows the decoding process performed by the entropy decoder 400 in more detail. First, in a step 500, the decoder 400 checks as to whether the next bin to decode is an mb_field_decoding_flag. If this is not the case, decoder 400 switches to another bin handling process (not shown) in step 502. If yes, decoder 400 determines in step 504 the context model to which the flag belongs. Step 504 is performed in the same way as step 304 in the encoding process, or as shown in FIG. 6.

Then, in step 506, the entropy decoder 400 arithmetically decodes the actual bin, i.e., mb_field_decoding_flag from the arithmetically coded bit stream by use of the actual probability state of the context model as indexed by ctxIdxMbField obtained in step 504. The result of this step is the value for mb_field_decoding_flag. Thereafter, in step 508, the ctxIdxMbField probability state is adapted or updated, as it was the case in step 320. Thereafter, the process ends at step 510.

The determination in step 504 yields the same index ctxIdxMbField since the macroblocks are stepped through in the precoded video signal in an appropriate order that guarantees that the flags mb_field_decoding_flag of macroblocks A and B (FIG. 6) have already been previously precoded. Thus, the context model can be deduced in step 504 on the basis of previously decoded flags mb_field_decoding_flag of neighbouring macroblocks as was the case on encoder side.

FIG. 11 shows the steps 506 and 508 being encompassed by dotted line 512 in more detail on the left hand side. On the right hand side, indicated with 514, FIG. 11 shows a memory and its content to which entropy decoder 400 has access in order to load, store and update variables. As can be seen, entropy decoder manipulates or manages the same variables as entropy coder 14 since entropy decoder 400 emulates the encoding process as will be described in the following.

In a first step 516, decoder 400 determines the value $R_{LPS}$, i.e. the range of the subinterval corresponding to the next bin being the LPS, based on R and $\sigma_i$. Thus, step 516 is identical to step 330. Then, in step 518, decoder 400 computes $R_{MPS} = R - R_{LPS}$ with $R_{MPS}$ being the range of the subinterval associated with the most probable symbol. The actual interval from L to R is thus subdivided into subintervals L to $L + R_{MPS}$ and $L + R_{MPS}$ to L+R. Now, in step 520 decoder 400 checks as to whether the value of the arithmetic coding codeword in the arithmetically coded bit stream falls into the lower or upper subinterval. The decoder 400 knows that the symbol mb_field_decoding_flag is the most probable symbol as indicated by $\omega_i$ when the value of the arithmetic codeword falls into the lower subinterval and accordingly sets mb_field_decoding_flag to the value of $\omega_i$ in step 522. In case the value falls into the upper subinterval, decoder 400 sets the symbol to be $1-\omega_i$ in step 524. After step 522, the decoder 400 actualizes the decoder state or the current interval as defined by R and L by setting R to be $R_{MPS}$ in step 524. Then, in step 526, the decoder 400 adapts or updates the probability state of the current context model i as defined by $\sigma_i$ and $\omega_i$ by transitioning the probability state index $\sigma_i$ as was described with respect to step 338 in FIG. 8. Thereafter, the process 512 ends at step 528.

After step 524, the decoder actualises the decoder state in step 530 by computing L=L+R and $R=R_{LPS}$. Thereafter, the decoder 400 adapts or updates the probability state in steps 532 and 534 by computing $\omega_i = 1 - \omega_i$ in step 432 and transitioning the probability state index $\sigma_i$ to a new probability state index in the same way as described with respect to step 346 in FIG. 8. Thereafter, the process ends at step 528.

After having described the present invention with respect to the specific embodiments, it is noted that the present invention is not restricted to these embodiments. In particular, the present invention is not restricted to a flag indicating frame/field mode coding of a macroblock or macroblock pair. Rather, the above description could be applied to other syntax elements as well.

With respect to step 310, the following is noted. Normally, a macroblock is coded into the precoded video signal. Nevertheless, it might be that a macroblock is not coded or skipped because, for instance, the corresponding transform coefficient levels of this macroblock are all smaller than a certain quantization threshold. Thus, for some macroblocks there is no mb_field_decoding_flag available. Thus, it might be that step 310 cannot be performed by merely investigating the mb_field_decoding_flag of the respective neighbouring macroblock if the latter is a skipped one. When mb_field_decoding_flag is not present for either macroblock of a neighbouring macroblock pair (containing A or B in FIG. 7) (when the bottom macroblock has a mb_field_decoding_flag, this one is chosen to be mb_field_decoding_flag of A or B), the following applies (it is assumed that the macroblock pair containing A is missing):

if there is a neighbouring macroblock pair to the left (of A) in the same slice, the value of mb_field_decoding_flag (of A) should be inferred to be equal to the value of mb_field_decoding_flag for the neighbouring macroblock pair to the left of the current macroblock pair (containing A), if there is no neighbouring macroblock pair to the left (of A) in the same slice, and there is a neighbouring macroblock pair above (of A) in the same slice, the value of mb_field_decoding_flag (of A) shall be inferred to be equal to the value of mb_field_decoding_flag of the neighbouring macroblock pair above the current macroblock pair (containing A), otherwise (if there is no neighbouring macroblock pair either on the left or above the current macroblock pair (containing A), the value of mb_field_decoding_flag (of A) shall be inferred to be equal to zero.

Of course, the above steps also apply for top macroblock B, by merely switching A to B.

Furthermore, other neighbouring relationships than those described with respect to FIGS. 6 and 7 might be used in order to determine the context model for arithmetically encoding the mb_field_decoding_flag.

Furthermore, as already noted, the above embodiments are also applicable to other control syntax elements or to other bins. Furthermore, the present invention is not restricted to binary arithmetic coding but could applied as well to other symbol arithmetic coding. Additionally, the subdivisions of the video frame into slices, macroblock pairs, macroblocks, picture elements etc. was for illustrating proposes only, and is not to restrict the scope of the invention to this special case.

In the following, reference is made to FIG. 12 to show, in more detail than in FIG. 1, the complete setup of a video encoder engine including an entropy-encoder as it is shown in FIG. 12 in block 800 in which the aforementioned arithmetic coding of mb_field_decoding_flag is used. In particular, FIG. 12 shows the basic coding structure for the emerging H.264/AVC standard for a macroblock. The input video signal is, split into macroblocks, each macroblock having 16×16 pixels. Then, the association of macroblocks to slice groups and slices is selected, and, then, each macroblock of each slice is processed by the network of operating blocks in FIG. 12. It is to be noted here that an efficient parallel processing of macroblocks is possible, when there are various slices in the picture. The association of macroblocks to slice groups and slices is performed by means of a block called coder control 802 in FIG. 12. There exist several slices, which are defined as follows:

I slice: A slice in which all macroblocks of the slice are coded using intra prediction.

P slice: In addition, to the coding types of the I slice, some macroblocks of the P slice can also be coded using inter prediction with at most one motion-compensated prediction signal per prediction block.

B slice: In addition, to the coding types available in a P slice, some macroblocks of the B slice can also be coded using inter prediction with two motion-compensated prediction signals per prediction block.

The above three coding types are very similar to those in previous standards with the exception of the use of reference pictures as described below. The following two coding types for slices are new:

SP slice: A so-called switching P slice that is coded such that efficient switching between different precoded pictures becomes possible.

SI slice: A so-called switching I slice that allows an exact match of a macroblock in an SP slice for random access and error recovery purposes.

Slices are a sequence of macroblocks, which are processed in the order of a raster scan when not using flexible macroblock ordering (FMO). A picture maybe split into one or several slices as shown in FIG. 14. A picture is therefore a collection of one or more slices. Slices are self-contained in the sense that given the active sequence and picture parameter sets, their syntax elements can be parsed from the bit stream and the values of the samples in the area of the picture that the slice represents can be correctly decoded without use of data from other slices provided that utilized reference pictures are identical at encoder and decoder. Some information from other slices maybe needed to apply the deblocking filter across slice boundaries.

FMO modifies the way how pictures are partitioned into slices and macroblocks by utilizing the concept of slice groups. Each slice group is a set of macroblocks defined by a macroblock to slice group map, which is specified by the content of the picture parameter set and some information from slice headers. The macroblock to slice group map consists of a slice group identification number for each macroblock in the picture, specifying which slice group the associated macroblock belongs to. Each slice group can be partitioned into one or more slices, such that a slice is a sequence of macroblocks within the same slice group that is processed in the order of a raster scan within the set of macroblocks of a particular slice group. (The case when FMO is not in use can be viewed as the simple special case of FMO in which the whole picture consists of a single slice group.)

Using FMO, a picture can be split into many macroblock-scanning patterns such as interleaved slices, a dispersed macroblock allocation, one or more "foreground" slice groups and a "leftover" slice group, or a checker-board type of mapping.

Each macroblock can be transmitted in one of several coding types depending on the slice-coding type. In all slice-coding types, the following types of intra coding are supported, which are denoted as Intra_4×4 or Intra_16×16 together with chroma prediction and I_PCM prediction modes.

The Intra_4×4 mode is based on predicting each 4×4 luma block separately and is well suited for coding of parts of a picture with significant detail. The Intra_16×16 mode, on the other hand, does prediction of the whole 16×16 luma block and is more suited for coding very smooth areas of a picture.

In addition, to these two types of luma prediction, a separate chroma prediction is conducted. As an alternative to Intra_4×4 and Intra_16×16, the I_PCM coding type allows the encoder to simply bypass the prediction and transform coding processes and instead directly send the values of the encoded samples. The I_PCM mode serves the following purposes:

1. It allows the encoder to precisely represent the values of the samples
2. It provides a way to accurately represent the values of anomalous picture content without significant data expansion
3. It enables placing a hard limit on the number of bits a decoder must handle for a macroblock without harm to coding efficiency.

In contrast to some previous video coding standards (namely H.263+ and MPEG-4 Visual), where intra prediction has been conducted in the transform domain, intra prediction in H.264/AVC is always conducted in the spatial domain, by referring to the bins of neighboring samples of previously coded blocks which are to the left and/or above the block to be predicted. This may incur error propagation in environments with transmission errors that propagate due to motion compensation into inter-coded macroblocks. Therefore, a constrained intra coding mode can be signaled that allows prediction only from intra-coded neighboring macroblocks.

When using the Intra_4×4 mode, each 4×4 block is predicted from spatially neighboring samples as illustrated on the left-hand side of FIG. 15. The 16 samples of the 4×4 block, which are labeled as a-p, are predicted using prior decoded samples in adjacent blocks labeled as A-Q. For each 4×4 block one of nine prediction modes can be utilized. In addition, to "DC" prediction (where one value is used to predict the entire 4×4 block), eight directional prediction modes are specified as illustrated on the right-hand side of FIG. 15. Those modes are suitable to predict directional structures in a picture such as edges at various angles.

In addition, to the intra macroblock coding types, various predictive or motion-compensated coding types are specified as P macroblock types. Each P macroblock type corresponds to a specific partition of the macroblock into the block shapes used for motion-compensated prediction. Partitions with luma block sizes of 16×16, 16×8, 8×16, and 8×8 samples are supported by the syntax. In case partitions with 8×8 samples are chosen, one additional syntax element for each 8×8 partition is transmitted. This syntax element specifies whether the corresponding 8×8 partition is further partitioned into partitions of 8×4, 4×8, or 4×4 luma samples and corresponding chroma samples.

The prediction signal for each predictive-coded M×N luma block is obtained by displacing an area of the corresponding reference picture, which is specified by a translational motion vector and a picture reference index. Thus, if the macroblock is coded using four 8×8 partitions and each 8×8 partition is further split into four 4×4 partitions, a maximum of sixteen motion vectors may be transmitted for a single P macroblock.

The quantization parameter SliceQP is used for determining the quantization of transform coefficients in H.264/AVC. The parameter can take 52 values. Theses values are arranged so that an increase of 1 in quantization parameter means an increase of quantization step size by approximately 12% (an increase of 6 means an increase of quantization step size by exactly a factor of 2). It can be noticed that a change of step size by approximately 12% also means roughly a reduction of bit rate by approximately 12%.

The quantized transform coefficients of a block generally are scanned in a zig-zag fashion and transmitted using entropy coding methods. The 2×2 DC coefficients of the chroma component are scanned in raster-scan order. All inverse transform operations in H.264/AVC can be implemented using only additions and bit-shifting operations of 16-bit integer values. Similarly, only 16-bit memory accesses are needed for a good implementation of the forward transform and quantization process in the encoder.

The entropy encoder 800 in FIG. 12 in accordance with a coding arrangement described above with respect to FIG. 2. A context modeler feeds a context model, i.e., a probability information, to an arithmetic encoder, which is also referred to as the regular coding engine. The to be encoded bit, i.e. a bin, is forwarded from the context modeler to the regular coding engine. This bin value is also fed back to the context modeler so that a context model update can be obtained. A bypass branch is provided, which includes an arithmetic encoder, which is also called the bypass coding engine. The bypass coding engine is operative to arithmetically encode the input bin values. Contrary to the regular coding engine, the bypass coding engine is not an adaptive coding engine but works preferably with a fixed probability model without any context adaption. A selection of the two branches can be obtained by means of switches. The binarizer device is operative to binarize non-binary valued syntax elements for obtaining a bin string, i.e., a string of binary values. In case the syntax element is already a binary value syntax element, the binarizer is bypassed.

Therefore, in CABAC (CABAC=Context-based Adaptive Binary Arithmetic Coding) the encoding process consists of at most three elementary steps:
1. binarization
2. context modeling
3. binary arithmetic coding In the first step, a given non-binary valued syntax element is uniquely mapped to a binary sequence, a so-called bin string. When a binary valued syntax element is given, this initial step is bypassed, as shown in FIG. 2. For each element of the bin string or for each binary valued syntax element, one or two subsequent steps may follow depending on the coding mode.

In the co-called regular coding mode, prior to the actual arithmetic coding process the given binary decision, which, in the sequel, we will refer to as a bin, enters the context modeling stage, where a probability model is selected such that the corresponding choice may depend on previously encoded syntax elements or bins. Then, after the assignment of a context model the bin value along with its associated model is passed to the regular coding engine, where the final stage of arithmetic encoding together with a subsequent model updating takes place (see FIG. 2).

Alternatively, the bypass coding mode is chosen for selected bins in order to allow a speedup of the whole encoding (and decoding) process by means of a simplified coding engine without the usage of an explicitly assigned model. This mode is especially effective when coding the bins of the primary suffix of those syntax elements, concerning components of differences of motion vectors and transform coefficient levels.

In the following, the three main functional building blocks, which are binarization, context modeling, and binary arithmetic coding in the encoder of FIG. 12, along with their interdependencies are discussed in more detail.

In the following, several details on binary arithmetic coding will be set forth.

Binary arithmetic coding is based on the principles of recursive interval subdivision that involves the following elementary multiplication operation. Suppose that an estimate of the probability $p_{LPS} \in (0, 0.5]$ of the least probable symbol (LPS) is given and that the given interval is represented by its lower bound L and its width (range) R. Based on that settings, the given interval is subdivided into two sub-intervals: one interval of width $$R_{LPS} = R \times p_{LPS},$$

which is associated with the LPS, and the dual interval of width $R_{MPS} = R - R_{LPS}$, which is assigned to the most probable symbol (MPS) having a probability estimate of $1 - p_{LPS}$. Depending on the observed binary decision, either identified as the LPS or the MPS, the corresponding sub-interval is then chosen as the new current interval. A binary value pointing into that interval represents the sequence of binary decisions processed so far, whereas the range of the interval corresponds to the product of the probabilities of those binary symbols. Thus, to unambiguously identify that interval and hence the coded sequence of binary decisions, the Shannon lower bound on the entropy of the sequence is asymptotically approximated by using the minimum precision of bits specifying the lower bound of the final interval.

An important property of the arithmetic coding as described above is the possibility to utilize a clean interface between modeling and coding such that in the modeling stage, a model probability distribution is assigned to the given symbols, which then, in the subsequent coding stage, drives the actual coding engine to generate a sequence of bits as a coded representation of the symbols according to the model distribution. Since it is the model that determines the code and its efficiency in the first place, it is of importance to design an adequate model that explores the statistical dependencies to a large degree and that this model is kept "up to date" during encoding. However, there are significant model costs involved by adaptively estimating higher-order conditional probabilities.

Suppose a pre-defined set T_ of past symbols, a so-called context template, and a related set C={0, . . . , C−1} of contexts is given, where the contexts are specified by a modeling function F. For each symbol x to be coded, a conditional probability p(x|F(z)) is estimated by switching between different probability models according to the already coded neighboring symbols z∈_ T. After encoding x using the estimated conditional probability p(x|F(z)) is estimated on the fly by tracking the actual source statistics. Since the number of different conditional probabilities to be estimated for an alphabet size of m is high, it is intuitively clear that the model cost, which represents the cost of "learning" the model distribution, is proportional to the number of past symbols to the power of four_-

This implies that by increasing the number C of different context models, there is a point, where overfitting of the model may occur such that inaccurate estimates of p(x|F(z)) will be the result.

This problem is solved in the encoder of FIG. 12 by imposing two severe restrictions on the choice of the context models. First, very limited context templates T consisting of a few neighbors of the current symbol to encode are employed such that only a small number of different context models C is effectively used.

Secondly, context modeling is restricted to selected bins of the binarized symbols and is of especially advantage with respect to primary prefix und suffix of the motion vector differences and the transform coefficient levels but which is also true for other syntax elements. As a result, the model cost is drastically reduced, even though the ad-hoc design of context models under these restrictions may not result in the optimal choice with respect to coding efficiency.

Four basic design types of context models can be distinguished. The first type involves a context template with up to two neighboring syntax elements in the past of the current syntax element to encode, where the specific definition of the kind of neighborhood depends on the syntax element. Usually, the specification of this kind of context model for a specific bin is based on a modeling function of the related bin values for the neighboring element to the left and on top of the current syntax element, as shown in FIG. 13. This design type of context modeling corresponds to the above description with respect to FIG. 1-11.

The second type of context models is only defined for certain data subtypes. For this kind of context models, the values of prior coded bins ($b_0$, $b_1$, $b_2$, . . . , $b_{i-1}$) are used for the choice of a model for a given bin with index i. Note that these context models are used to select different models for different internal nodes of a corresponding binary tree.

Both the third and fourth type of context models is applied to residual data only. In contrast to all other types of context models, both types depend on context categories of different block types. Moreover, the third type does not rely on past coded data, but on the position in the scanning path. For the fourth type, modeling functions are specified that involve the evaluation of the accumulated number of encoded (decoded) levels with a specific value prior to the current level bin to encode (decode).

Besides these context models based on conditional probabilities, there are fixed assignments of probability models to bin indices for all those bins that have to be encoded in regular mode and to which no context model of the previous specified category can be applied.

The above described context modeling is suitable for a video compression engine such as video compression/decompression engines designed in accordance with the presently emerging H.264/AVC video compression standard. To summarize, for each bin of a bin string the context modeling, i.e., the assignment of a context variable, generally depends on the to be processed data type or sub-data type, the precision of the binary decision inside the bin string as well as the values of previously coded syntax elements or bins. With the exception of special context variables, the probability model of a context variable is updated after each usage so that the probability model adapts to the actual symbol statistics.

An specific example for a context-based adaptive binary arithmetic coding scheme to which the assignment of context model of the above embodiments could be applied is described in: D. Marpe, G. Blättermann, and T. Wiegand, "Adaptive codes for H.26L," ITU-T SG16/Q.6 Doc. VCEG-L13, Eibsee, Germany, January 2003-07-10.

What is claimed is:

1. A method for encoding a syntax element contained in a precoded video signal into a coded bit stream, the precoded video signal representing at least one video frame, the syntax element being associated with a predetermined portion of the video frame and being indicative of as to whether the predetermined portion of the video frame is precoded in a first or a second way into the precoded video signal, the method comprising the following steps:

investigating as to whether a neighboring portion of the video frame neighboring the predetermined portion is precoded in the first way or the second way, in order to obtain a binary value;

assigning one of at least two context models to the predetermined portion of the video frame based on the binary value, wherein each context model is associated with a different probability estimation; and arithmetically encoding the syntax element into the coded bit stream based on the probability estimation with which the assigned context model is associated.

2. The method of claim 1, wherein the video frame is spatially subdivided into an array of macroblock pairs, each macroblock pair consisting of two macroblocks, and the predetermined portion is a predetermined macroblock in a predetermined macroblock pair and the neighbouring portion is a neighbouring macroblock in a neighbouring macroblock pair adjacent to the predetermined macroblock pair.

3. The method of claim 1, wherein the syntax element is contained several times in the precoded video signal, each time being associated with a different portion of the video frame, and wherein the method is conducted each time.

4. The method of claim 1, wherein the step of investigating comprises the step of investigating a syntax element associated with the neighbouring portion.

5. The method of claim 2, wherein the video frame is composed of picture samples, the picture samples belonging either to a first or a second field being captured at different time instants, and wherein the syntax element is a frame/field decoding flag indicating as to whether the predetermined macroblock merely contains either picture samples belonging to the first field or picture samples belonging to the second field or the predetermined macroblocks contains both, picture samples belonging to the first field and picture samples belonging to the second field, and wherein the step of investigating comprises investigating as to whether said neighbouring macroblock merely contains either picture samples belonging to the first field or picture samples belonging to the second field, or the neighbouring macroblock contains both, picture samples belonging to the first field and picture samples belonging to the second field.

6. The method of claim 2, wherein each macroblock is assigned to a macroblock address, and the step of investigating comprises the following steps:
   a) computing a neighbouring macroblock address based on a macroblock address of the predetermined macroblock in order to obtain a computed neighbouring macroblock address for the neighbouring macroblock;
   b) checking, as to whether the computed neighbouring macroblock address is assigned one of the macroblocks in the video frame, in order to obtain a check result;
   c) if the check result is positive, investigating as to whether the macroblock assigned to the computer neighbouring macroblock address is precoded in the first way or the second way;
   d) if the check result is positive and the macroblock assigned to the computed neighbouring macroblock address is precoded in a predetermined one of the first and the second way, setting the binary value to a first bit value; and
   e) if the check result is negative or the macroblock assigned to the computed neighbouring macroblock address is not precoded in the predetermined one of the first and the second way, setting the binary value to a second bit value being different to the first bit value.

7. The method of claim 6, wherein the macroblocks are grouped into slices and step b) is adapted such that the check result is merely positive if the macroblock assigned to the computed neighbouring macroblock address belongs to the same slice as the predetermined macroblock.

8. The method of claim 6, wherein steps a) to e) are performed another time using a different dependency on the macroblock address of the predetermined macroblock in step a), thereby obtaining a further binary value, and wherein the step of assigning is adapted to perform association based on both binary values.

9. The method of claim 8, wherein the step of assigning comprises adding the first and the second value to obtain a context model index corresponding to the context model.

10. The method of claim 1, wherein the step of arithmetically encoding comprises the following steps:
   deducing a current arithmetic code interval in accordance with the probability estimation with which the assigned context model is associated to one of two subintervals into which the probability estimation with which the assigned context model is associated separates the current arithmetic code interval, in order to obtain a reduced current arithmetic coding interval, wherein the coded bit stream depends on the reduced current arithmetic coding interval.

11. The method of claim 1, further comprising:
   adapting the probability estimation with which the assigned context model is associated based on the syntax element.

12. A method for decoding a syntax element from a coded bit stream, the syntax element being contained in a precoded video signal, the precoded video signal representing at least one video frame, the syntax element being associated with a predetermined portion of the video frame and being indicative of as to whether the predetermined portion of the video frame is precoded in a first or a second way into the precoded video signal, the method comprising the following steps:
   investigating as to whether a neighboring portion of the video frame neighboring the predetermined portion is precoded in the first way or the second way, in order to obtain a binary value;
   assigning one of at least two context models to the predetermined portion of the video frame based on the binary value, wherein each context model is associated with a different probability estimation; and
   arithmetically decoding the syntax element from the precoded bit stream based on the probability estimation with which the assigned context model is associated.

13. The method of claim 12, wherein the video frame is spatially subdivided into an array of macroblock pairs, each macroblock pair consisting of two macroblocks, and the predetermined portion is a predetermined macroblock in a predetermined macroblock pair and the neighbouring portion is a neighbouring macroblock in a neighbouring macroblock pair adjacent to the predetermined macroblock pair.

14. The method of claim 12, wherein the syntax element is contained several times in the precoded video signal, each time being associated with a different portion of the video frame, and wherein the method is conducted each time.

15. The method of claim 12, investigating comprises the step of investigating a syntax element associated with the neighbouring portion.

16. The method of claim 13, wherein the video frame is composed of picture samples, the picture samples belonging either to a first or a second field being captured at different time instants, and wherein the syntax element is a frame/field decoding flag indicating as to whether the predetermined macroblock merely contains either picture samples belonging to the first field or picture samples belonging to the second field or the predetermined macroblocks contains both, picture samples belonging to the first field and picture samples belonging to the second field, and wherein the step of investigating comprises investigating as to whether said neighbouring macroblock merely contains either picture samples belonging to the first field or picture samples belonging to the second field, or the neighbouring macroblock contains both, picture samples belonging to the first field and picture samples belonging to the second field.

17. The method of claim 12, wherein each macroblock is assigned to a macroblock address, and the step of investigating comprises the following steps:
   a) computing a neighbouring macroblock address based on a macroblock address of the predetermined macroblock in order to obtain a computed neighbouring macroblock address for the neighbouring macroblock;
   b) checking, as to whether the computed neighbouring macroblock address is assigned one of the macroblocks in the video frame, in order to obtain a check result;
   c) if the check result is positive, investigating as to whether the macroblock assigned to the computer neighbouring macroblock address is precoded in the first way or the second way;
   d) if the check result is positive and the macroblock assigned to the computed neighbouring macroblock address is precoded in a predetermined one of the first and the second way, setting the binary value to a first bit value; and
   e) if the check result is negative or the macroblock assigned to the computed neighbouring macroblock address is not precoded in the predetermined one of the first and the second way, setting the binary value to a second bit value being different to the first bit value.

18. The method of claim 17, wherein the macroblocks are grouped into slices and step b) is adapted such that the check result is merely positive if the macroblock assigned to the computed neighbouring macroblock address belongs to the same slice as the predetermined macroblock.

19. The method of claim 17, wherein steps a) to e) are performed another time using a different dependency on the macroblock address of the predetermined macroblock in step a), thereby obtaining a further binary value, and wherein the assigning is adapted to perform association based on both binary values.

20. The method of claim 19, wherein the step of assigning comprises adding the first and the second value to obtain the context model corresponding to the context model.

21. The method of claim 12, wherein the step of arithmetically decoding comprises the following steps:
checking as to whether an arithmetic codeword value indicated by the coded bit stream falls into a first or a second of two subintervals, into which the probability estimation with which the assigned context model is associated separates a current arithmetic code interval, wherein a value of the syntax element depends on the subinterval in which the arithmetic codeword value falls.

22. The method of claim 12, further comprising:
adapting the probability estimation with which the assigned context model is associated based on the syntax element.

23. A memory device having stored therein a computer program having instructions for perform, when running on a computer, a method for encoding a syntax element contained in a precoded video signal into a coded bit stream, the precoded video signal representing at least one video frame, the syntax element being associated with a predetermined portion of the video frame and being indicative of as to whether the predetermined portion of the video frame is precoded in a first or a second way into the precoded video signal, the method comprising the following steps:
investigating as to whether a neighboring portion of the video frame neighboring the predetermined portion is precoded in the first way or the second way, in order to obtain a binary value;
assigning one of at least two context models to the predetermined portion of the video frame based on the binary value, wherein each context model is associated with a different probability estimation; and
arithmetically encoding the syntax element into the coded bit stream based on the probability estimation with which the assigned context model is associated.

24. A memory device having stereo stored therein a computer program having instructions for performing, when running on a computer, a method for decoding a syntax element from a coded bit stream, the syntax element being contained in a precoded video signal, the precoded video signal representing at least one video frame, the syntax element being associated with a predetermined portion of the video frame and being indicative of as to whether the predetermined portion of the video frame is precoded in a first or a second way into the precoded video signal, the method comprising the following steps:
investigating as to whether a neighboring portion of he video frame neighboring the predetermined portion is precoded in the first way or the second way, in order to obtain a binary value;
assigning one of at least two context models to the predetermined portion of the video frame based on the binary value, wherein each context model is associated with a different probability estimation; and
arithmetically decoding the syntax element from the precoded bit stream based on the probability estimation with which the assigned context model is associated.

25. An apparatus for encoding a syntax element contained in a precoded video signal into a coded bit stream, the precoded video signal representing at least one video frame, the syntax element being associated with a predetermined portion of the video frame and being indicative of as to whether the predetermined portion of the video frame is precoded in a first or a second way into the precoded video signal, the apparatus comprising
means for investigating as to whether a neighboring portion of the video frame neighboring the predetermined portion is precoded in the first way or the second way, in order to obtain a binary value;
means for assigning one of at least two context models to the predetermined portion of the video frame based on the binary value, wherein each context model is associated with a different probability estimation; and
means for arithmetically encoding the syntax element into the coded bit stream based on the probability estimation with which the assigned context model is associated.

26. An apparatus for decoding a syntax element from a coded bit stream, the syntax element being contained in a precoded video signal, the precoded video signal representing at least one video frame, the syntax element being associated with a predetermined portion of the video frame and being indicative of as to whether the predetermined portion of the video frame is precoded in a first or a second way into the precoded video signal, the apparatus comprising
means for investigating as to whether a neighboring portion of the video frame neighboring the predetermined portion is precoded in the first way or the second way, in order to obtain a binary value;
means for assigning one of at least two context models to the predetermined portion of the video frame based on the binary value, wherein each context model is associated with a different probability estimation; and
means for arithmetically decoding the syntax element from the precoded bit stream based on the probability estimation with which the assigned context model is associated.

* * * * *